United States Patent [19]
Terajima

[11] Patent Number: 5,581,142
[45] Date of Patent: Dec. 3, 1996

[54] VIBRATION CONTROL DEVICE FOR SAFELY INDUCED VIBRATION OF GYROSCOPES

[75] Inventor: Kokichi Terajima, Tokyo, Japan

[73] Assignee: Akai Electric Co., Ltd., Ohta-ku, Japan

[21] Appl. No.: 371,029

[22] Filed: Jan. 10, 1995

[30] Foreign Application Priority Data

| Jan. 14, 1994 | [JP] | Japan | 6-002364 |
| Feb. 1, 1994 | [JP] | Japan | 6-010348 |
| Jul. 8, 1994 | [JP] | Japan | 6-157493 |
| Jul. 20, 1994 | [JP] | Japan | 6-168141 |

[51] Int. Cl.⁶ .................................. H01L 41/08
[52] U.S. Cl. ............................................ 310/316
[58] Field of Search ........................... 310/315–319, 310/323, 321

[56] References Cited

U.S. PATENT DOCUMENTS

| 5,270,607 | 12/1993 | Terajima | 310/316 |
| 5,412,204 | 5/1995 | Nakamura | 310/316 X |
| 5,434,467 | 7/1995 | Abe et al. | 310/316 X |
| 5,455,476 | 10/1995 | Nakamura | 310/316 |
| 5,473,288 | 12/1995 | Kumada | 310/316 X |

FOREIGN PATENT DOCUMENTS

| 0517259 | 12/1992 | European Pat. Off. . |
| 60-222715 | 4/1984 | Japan . |
| 63-08110 | 7/1988 | Japan . |

OTHER PUBLICATIONS

"Basic Circuit Design Techniques Yield Stable Clock Oscillators", J. Williams, E.D.N. Electrical Design News, vol. 28, No. 17, Aug., 1983, pp. 165–175.

Primary Examiner—Mark O. Budd
Attorney, Agent, or Firm—Meltzer, Lippe, Goldstein, et al.

[57] ABSTRACT

A vibration control apparatus capable of setting the frequency of self-oscillating or self-induced vibration of an oscillator to a frequency in near agreement with the mechanical series resonance frequency $f_s$ is provided. The apparatus comprises a vibrator having a single piezo-electric element on the side surface of a vibrator member having a resonance point, drive apparatus having signal output terminal that outputs the drive signal of vibrator, and feedback amplifier having signal input terminal and feedback input terminal. The signal input terminal of feedback amplifier is connected to signal output terminal of drive apparatus. The feedback input terminal is connected to one electrode of piezo-electric element. The other electrode of piezo-electric element is connected to ground.

56 Claims, 19 Drawing Sheets

5,581,142

VIBRATION CONTROL DEVICE FOR SAFELY INDUCED VIBRATION OF GYROSCOPES

RELATED APPLICATIONS

The following related patent applications have been filed concurrently in the United States Patent and Trademark Office and are hereby incorporated by reference:

VIBRATION CONTROL APPARATUS HAVING AUTOMATIC GAIN CONTROL, to K. Terajima, claiming priority of Japanese Patent Applications: 6-153953 and 6-168142;

ANGULAR VELOCITY DETECTION CIRCUIT FOR VIBRATORY GYROSCOPES, to K. Terajima, claiming priority of Japanese Patent Applications: 6-50103; and VIBRATION CONTROL APPARATUS HAVING OSCILLATION FREQUENCY REGULATION, to K. Terajima, claiming priority of Japanese Patent Applications: 6-205405 and 6-188403.

FIELD OF THE INVENTION

The present invention relates to a vibration control apparatus using, for example, a piezo-electric type vibration gyroscope.

BACKGROUND OF THE INVENTION

An example of a conventional vibration gyroscope is illustrated in FIG. 18. In this vibration gyroscope, piezo-electric elements 2 and 3, which form vibrator 4, are respectively connected via the impedance elements Z1 and Z2 to the output side of a drive apparatus 6. The output side of the drive apparatus 6 is also connected, via another impedance element Z3, to a capacitor C, so that drive signals from the drive apparatus 6 are simultaneously applied to the piezo-electric elements 2 and 3 and on the capacitor C.

The outputs at the respective nodes of impedance elements Z1 and Z2 and piezo-electric elements 2 and 3 are combined. This combined output and the output at the nodes of impedance element Z3 and capacitor C are supplied to differential amplifier 7. The differential output is fed back to drive apparatus 6 so that vibrator 4 self-oscillates. The outputs at the respective nodes of impedance elements Z1 and Z2 and piezo-electric elements 2 and 3 are supplied to another differential amplifier 8, so as to obtain an angular velocity detection signal based on the output from the differential amplifier 8.

An example Of a vibrator 4, shown in FIG. 19, has a square cross sectional shape and has piezo-electric element 2 on one side surface 1a of vibration member 1 having a resonance point and piezo-electric element 3 on another side surface 1b adjoining the first side surface 1a. Another example of a vibrator 4, shown in FIG. 20, has piezo-electric elements 2 and 3 split in the wide direction on the same side of vibration member 1. Another example of a vibrator 4, shown in FIG. 21, has piezo-electric elements 2 and 3 on opposite sides of vibration member 1. Another example of a vibrator 4, shown in FIG. 22, has the respective piezo-electric elements 2a and 2b on opposite side surfaces of vibration member 1 and connects them in parallel so that they also act essentially as one piezo-electric element 2 and also has the respective piezo-electric elements 3a and 3b on the other opposite sides so as to connect them in parallel so that they act essentially as one piezo-electric element 3.

Still another example of a vibrator 4, shown in FIG. 23, has a triangular cross-sectional shape and piezo-electric elements 2 and 3 on two side surfaces of vibration member 1 having a resonance point. Another example of a vibrator 4, as shown in FIG. 24, has a circular cross-sectional shape and piezo-electric elements 2 and 3 on the peripheral surface of vibrator member 1 having a resonance point. Thus, members having essentially two piezo-electric elements are formed on the side surfaces of vibration members having various sectional shapes.

FIG. 26 shows a vibrator 4 with a single piezo-electric element 5 formed on vibration member 1, as shown in FIG. 25. FIG. 27 shows a vibrator 4 having two piezo-electric elements 2 and 3, is as shown in FIGS. 19 through 24.

However, the conventional vibration gyroscope shown in FIG. 18 is made so that it applies the drive signals from drive apparatus 6 to piezo-electric elements 2 and 3 via impedance elements Z1 and Z2. Therefore, the signal level applied to piezo-electric elements 2 and 3 decreases when the impedances of piezo-electric elements 2 and 3 decrease in the vicinity of the mechanical series resonance frequency $f_s$ in vibrator 4. The frequency at which the output from differential amplifier 7 is at a maximum and the mechanical series resonance frequency $f_s$ do not coincide. This phenomenon will be explained next, with reference to FIG. 28 and FIG. 29.

FIGS. 28A and B illustrate measurement examples of the frequency and phase characteristics of admittance |Y| of vibrator of the construction shown in FIG. 19. FIGS. 29A and B show the transfer and phase characteristics of differential amplifier 7. The vibration gyroscope illustrated in FIG. 18 connects piezo-electric elements 2 and 3 directly to the respective impedances Z1 and Z2, so that, as will be understood from FIG. 28A, the signal levels applied to these piezo-electric elements 2 and 3 decrease in the vicinity of the mechanical series resonance frequency $f_s$ where |Y| is large and increase in the vicinity of the mechanical parallel resonance frequency $f_a$ where |Y| is small. Therefore, the output of differential amplifier 7 receives the effect of the mechanical parallel resonance frequency $f_a$ with its high signal level. The maximum value frequency shifts to the mechanical parallel resonance frequency $f_a$, as shown in FIG. 29A.

Vibrator 4, as indicated by the equivalent circuit in FIG. 30, is represented with regard to one piezo-electric element as a parallel resonance circuit where damping capacity Cd is connected in parallel to the series resonance circuit comprising inductor coil L1, capacitor C1 and resistance R1. Resistances and capacitors, for example, are used for impedance elements Z1 and Z2. When capacitors are used as impedance elements Z1 and Z2, the impressed signals also create phase changes determined by the value of damping capacity Cd relative to the resistance values of impedance elements Z1 and Z2. Therefore, the levels and phases of the applied signals vary in a complex fashion with the impedance changes in vibrator 4 and the frequency where the output of differential amplifier 7 is at maximum goes to the mechanical parallel resonance frequency $f_a$.

Furthermore, the equivalent constants of vibrator 4, i.e., damping capacity Cd, inductor L1, capacitor C1 and resistance R1, have individual temperature dependencies. Therefore, the frequencies where the output of differential amplifier 7 is at a maximum will vary under variations of ambient temperature. Since self-oscillating vibration occurs at frequencies where the output of differential amplifier 7 is at a maximum, variations in set frequencies of self-oscillating vibration are easily brought about by variations in ambient temperatures.

The mechanical quality coefficient $Q_m$ of vibrator 4 is such that there will be no accurate agreement between the values on the piezo-electric element 2 side and the values on the piezo-electric element 3 side, so that fluctuations in the set frequencies of self-oscillating vibration bring about differences in the outputs of impedance elements Z1 and Z2 and the nodes of piezo-electric elements 2 and 3, so that low voltages and fluctuations tend to occur.

Furthermore, vibrator 4 has impedance elements Z1 and Z2 connected to piezo-electric elements 2 and 3 which leads to high impedance overall. The effects of electrical noise tend to occur at the respective nodes of piezo-electric elements 2 and 3 and impedance elements Z1 and Z2.

SUMMARY AND OBJECTS OF THE INVENTION

An object of the present invention is to provide a vibration control apparatus which imparts self-oscillating vibration that stabilizes vibrators at frequencies set by the mechanical series resonance frequency $f_s$. The formation of low voltage and fluctuations when the apparatus is used with vibration gyroscopes is effectively decreased.

It is another object of the present invention to provide a vibration control apparatus wherein the frequency of self-oscillating vibration in the vibrator can be set to a frequency that is in near agreement with the mechanical series resonance frequency $f_s$.

Another object of the present invention is to provide a vibration control apparatus wherein the frequency of self-oscillating vibration in the vibrator can be set to a frequency that is in accurate agreement with the mechanical series resonance frequency $f_s$.

Another object of the present invention is to provide a vibration control apparatus wherein the frequency of self-oscillating vibration in the vibrator can be set to a frequency that is in near agreement with the mechanical series resonance frequency $f_s$, while at the same time the formation of low voltage and fluctuations can be effectively decreased.

Another object of the present invention is to provide a vibration control apparatus wherein the frequency of self-oscillating vibration in the vibrator can be set to a frequency that is in accurate agreement with the mechanical series resonance frequency $f_s$, while at the same time the formation of low voltage and fluctuations can be effectively decreased.

In a first embodiment of the invention, a vibration control apparatus is provided which comprises a vibrator having a single piezo-electric element on the side surface of a vibrator member having a resonance point, a drive apparatus having a signal output terminal that outputs the drive signal of the vibrator, and a feedback amplifier having a feedback input terminal and a signal input terminal. The signal input terminal of the feedback amplifier is connected to the signal output terminal of the drive apparatus. The feedback input terminal is connected to one electrode of the piezo-electric element. The other electrode of the piezo-electric element is connected to ground.

The output of the feedback amplifier may be fed back to the drive apparatus so that the vibrator is given self-oscillating vibration by stabilizing the vibrator at nearly the mechanical series resonance frequency.

In a second embodiment of the invention, a vibration control apparatus is provided which comprises a vibrator having a single piezo-electric element on the side surface of a vibrator member having a resonance point, a drive apparatus having a signal output terminal that outputs the drive signal of the vibrator and a compensating signal output terminal that outputs a compensating signal for the damping capacity of the vibrator, and a feedback amplifier having a feedback input terminal and a signal input terminal. The signal input terminal of the feedback amplifier is connected to the signal output terminal of the drive apparatus. The feedback input terminal is connected to one electrode of the piezo-electric element. The other electrode of the piezo-electric element is connected to the compensating signal output terminal of the drive apparatus.

The output of the feedback amplifier may be fed back to the drive apparatus so that the vibrator is given self-oscillating vibration by stabilizing at a frequency in accurate agreement with the mechanical series resonance frequency.

In a third embodiment of the invention, a control apparatus is provided which comprises a vibrator similar to the second embodiment. The signal input terminal of the feedback amplifier is connected to the drive apparatus. The feedback input terminal is connected to one electrode of the piezo-electric element. The other electrode of the piezo-electric element is connected to ground. The compensating signal output terminal of the drive apparatus is connected to the output terminal of the feedback amplifier.

The combined output from the compensation signal output terminal of the drive apparatus may be fed back to the drive apparatus so that the vibrator is given self-oscillation vibration by stabilizing at a frequency that agrees accurately with the mechanical series resonance frequency.

In a fourth embodiment of the invention, the respective signal input terminals of the two feedback amplifiers are connected to the signal output terminal of the drive apparatus. The feedback input terminal of one feedback amplifier is connected to one electrode of one piezo-electric element. The feedback input terminal of the other feedback amplifier is connected to one electrode of the other piezo-electric element. The respective other electrodes of these piezo-electric elements are connected to ground.

The respective outputs of the two feedback amplifiers may be combined and fed back to the drive apparatus, so that the vibrator is given self-oscillation or self-induced vibration by stabilizing the vibrator at nearly the mechanical series resonance frequency.

In a fifth embodiment of the invention, the respective signal input terminals of the two feedback amplifiers are connected to the signal output terminal of the drive apparatus. The feedback input terminal of one feedback amplifier is connected to one electrode of one piezo-electric element. The feedback input terminal of the other feedback amplifier is connected to one electrode of the other piezo-electric element. The respective other electrodes of these piezo-electric elements are connected to the compensating signal output terminal of the drive apparatus.

The respective outputs of the two feedback amplifiers, in the fifth embodiment, may be combined and fed back to the drive apparatus so that the vibrator is given self-oscillation vibration by stabilizing at a frequency that agrees accurately with the mechanical series resonance frequency.

In a sixth embodiment of the invention, the respective signal input terminals of the two feedback amplifiers are connected to the signal output terminal of the drive apparatus. The feedback input terminal of one feedback amplifier is connected to one electrode of one piezo-electric element. The feedback input terminal of the other feedback amplifier is connected to one electrode of the other piezo-electric element. The respective other electrodes of the piezo-electric elements are connected to ground. The compensating signal output terminal of the drive apparatus is connected to the respective two feedback amplifiers.

The combined output, i.e., the compensation signal and the respective outputs from the two feedback amplifiers, may be fed back to the drive apparatus, so that the vibrator is given self-oscillation or self-induced vibration by stabilizing at a frequency that agrees accurately with the mechanical series resonance frequency.

In another embodiment of the invention, the amplitude and phase of the output signal from the compensating signal output terminal of the drive apparatus may be changed in correspondence with the value of the damping capacity of the vibrator.

In a further embodiment of the invention, a differential amplifier is provided which detects the difference in outputs of the two feedback amplifiers so that the angular velocity acting on the vibrator can be detected.

In still another embodiment of the invention, the drive apparatus comprises a capacitor having a temperature dependence corresponding to the temperature dependence of the damping capacity of the vibrator. The amplitude and phase of the compensation signal are changed in correspondence with the temperature dependence of the damping capacity of the vibrator by the capacitor. Therefore, the vibrator vibrates stabilized at a frequency in accurate agreement with the mechanical series resonance frequency without being affected by the ambient temperature.

In another embodiment of the invention, the capacitor has the same composition as the piezo-electric elements. The temperature dependence of the damping capacity of the vibrator and the temperature dependence of the compensation signal are related, so that the vibrator vibrates stabilized at a frequency in accurate agreement with the mechanical series resonance frequency without being affected by the ambient temperature.

In the first embodiment, when the signal output terminal of the drive apparatus is combined with the signal input terminal of the feedback amplifier and one electrode of a piezo-electric element is combined with the feedback input terminal of the feedback amplifier, the feedback voltage gain of the feedback amplifier varies with the impedance of the piezo-electric element and maximizes at a frequency that nearly agrees with the mechanical series resonance frequency of the vibrator.

As in the second embodiment, some of the slippage from the mechanical series resonance frequency $f_s$ of the vibrator caused by the damping capacity is compensated for by inputting the compensation signal from the drive apparatus of the damping capacity of the vibrator into the other electrode of the piezo-electric element, or as in the third embodiment above, by combining the compensation signal with the output signal of the feedback amplifier, thereby, making it possible to have a more accurate frequency setting for self-oscillating vibration.

Thus, by operating while stabilizing the vibrator at its self-oscillating vibration frequency, the respective outputs are stabilized even when two feedback amplifiers are furnished in a vibrator having a pair of piezo-electric elements. Consequently, the difference in outputs of the two, i.e., low voltage and fluctuations, can be effectively decreased.

The fourth embodiment controls the vibration of a vibrator having a pair of piezo-electric elements. Therefore, it is possible to set the frequency of the self-oscillating frequency of the vibrator to near agreement with the mechanical series frequency resonance frequency $f_s$, while at the same time stabilizing the respective outputs of the amplifiers relative to the piezo-electric elements. Consequently, it is also possible to effectively decrease low voltage formation and fluctuation. Also, with the fifth and sixth embodiments, it is possible to set the frequency of self-oscillation vibration of the vibrator to a frequency in accurate agreement with the mechanical series resonance frequency $f_s$.

In a seventh embodiment of the invention, the respective signal input terminals of the two feedback amplifiers are connected to the signal output terminal. The feedback input terminal of one feedback amplifier is connected to one electrode of one of the piezo-electric elements and the feedback input terminal of the other feedback amplifier is connected to one electrode of the other piezo-electric element. The combined signal of the compensation signal and the signals from the other electrode of the piezo-electric elements is fed back to the feedback apparatus.

In an eighth embodiment of the invention, the respective signal input terminals of the two feedback amplifiers are connected to the signal output terminal. The feedback input terminal of one feedback amplifier is connected to one electrode of one of the piezo-electric elements and the feedback input terminal of the other feedback amplifier is connected to one electrode of the other piezo-electric element. The combined signal comprising the compensation signal and the signals from the other electrodes of the piezo-electric elements is fed back to the feedback apparatus. A signal that is in-phase with the drive signal based on this combined signal is supplied to the respective input terminals of the two feedback amplifiers.

In a ninth embodiment of the invention, the two feedback amplifiers have at least one feedback resistance that is a variable resistance. The signal input terminals of the two feedback amplifiers are connected to the signal input terminal. The feedback input terminal of one feedback amplifier is connected to one electrode of one piezo-electric element. The feedback input terminal of the other feedback amplifier is connected to one electrode of the other piezo-electric element. The other electrodes of the piezo-electric elements are connected to the compensation signal output terminal. A combined signal comprising the compensation signal and the signals of the other electrodes of the piezo-electric elements is fed back to the drive apparatus. A signal in-phase with the drive signal based on this combined signal is supplied via a variable resistance to the feedback input terminals of the two feedback amplifiers.

In a preferred embodiment, the in-phase signal is formed by combining the combined signal and the compensation signal. The in-phase signal is varied in correspondence with the temperature dependence of the equivalent resistances of the pair of piezo-electric elements. Thus, the formation of low voltage and the accompanying fluctuations are effectively decreased.

In another preferred embodiment, the in-phase signal is formed by combining the combined signal and the drive signal. The in-phase signal is varied in correspondence with the temperature dependence of the equivalent resistances of the pair of piezo-electric elements. Thus, the formation of low voltage and the accompanying fluctuations are effectively decreased.

In still another preferred embodiment, the amplitude and phase of the compensation signal are varied in correspondence with the value of the damping capacity of the vibrator, so as to obtain accurate compensation of the damping capacity.

In yet another preferred embodiment, a differential amplifier is provided. The differential amplifier detects the difference in outputs of the two feedback amplifiers, from the standpoint of detecting the vibration in a direction that intersects the self-oscillation vibration direction of the vibrator.

In another preferred embodiment, a capacitor having a temperature dependence corresponding to the damping capacity of the vibrator is connected to the compensation signal output terminal of the drive apparatus. The imaginary part of the signal relative to the damping capacity of the vibrator is removed from the combined signal. Therefore, the vibrator is in accurate self-oscillation or self-induced vibration at the mechanical series resonance frequency.

In still another preferred embodiment, the capacitor has the same composition as the piezo-electric elements. The imaginary part relative to the damping capacity of the vibrator is removed from the combined signal. Therefore, the vibrator is in accurate self-oscillation or self-induced vibration at the mechanical series resonance frequency without being affected by changes in the ambient atmosphere.

The signal output terminal of the drive apparatus is connected to the signal input terminals of two feedback signal input terminals. One set of electrodes of a pair of piezo-electric elements are connected to the respective feedback input terminals of two feedback amplifiers, while the other electrodes are connected to the compensation signal output terminal of the drive apparatus. When the combined signal of the compensation signal and the signals of the other electrodes are fed back to the drive apparatus, it goes to maximum at a frequency in accurate agreement with the mechanical series resonance frequency of the vibrator. Consequently, it becomes possible to have an accurate frequency setting for self-excitation vibration by stabilizing the vibrator at a frequency set to the mechanical series resonance frequency $f_s$ and to slightly suppress formation of low voltage and fluctuations.

Also, when the in-phase signal is supplied to the respective feedback input terminals of the two feedback amplifiers, it is possible to effectively decrease the difference between the outputs of the two feedback amplifiers, i.e., to decrease the formation of low voltage.

Furthermore, when the in-phase signal is supplied to the feedback input terminals of the two feedback amplifiers through a variable resistance, it is possible to make fine adjustments in the difference in the real parts of the outputs of the two feedback amplifiers. When at least one of the feedback resistances of the two feedback amplifiers is a variable feedback resistance, it is possible to make fine adjustments in the difference in the imaginary parts of the outputs of the two feedback amplifiers, which in turn makes it possible to very effectively decrease the formation of low voltage.

Thus, by having the amplifier operate stabilized at its self-excitation vibration frequency and/or by making fine adjustments in the real parts and imaginary parts of the respective outputs of the two feedback amplifiers by means of variable resistance and variable feedback resistance, it is possible to stabilize the outputs of the two feedback amplifiers relative to a vibrator having a pair of piezo-electric elements and, thus, effectively decrease formation of low voltage and the accompanying fluctuations.

DETAILED DESCRIPTION OF THE INVENTION

The invention will next be explained by examples, with reference to the drawings. In the Figures, the same reference numbers are used for the same parts discussed in the Background section.

Figure 1:
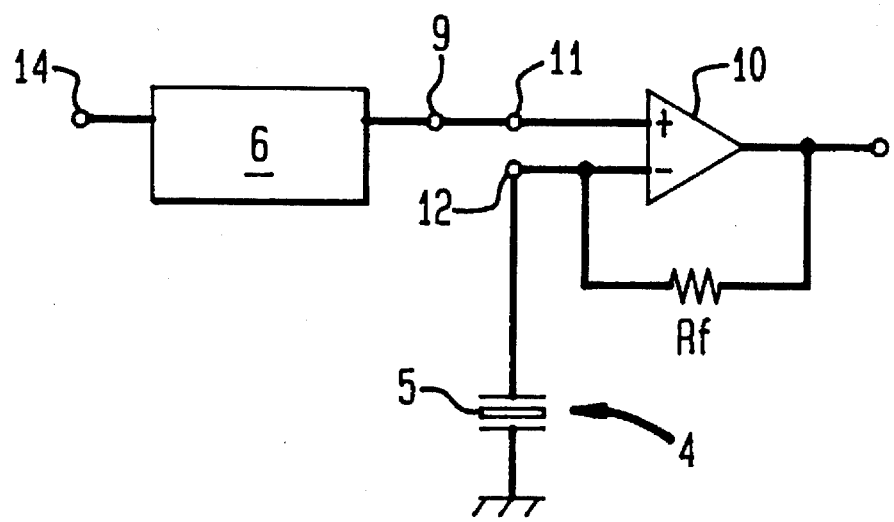
FIG. 1 illustrates Example 1 of the invention.
Figure 25:
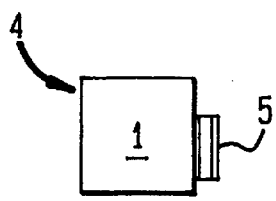
Figure 26:
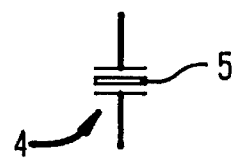
FIG. 26 illustrates a vibrator.
Figure 22:
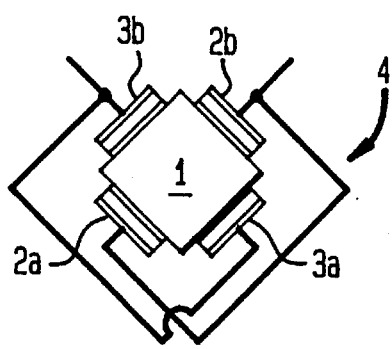
Figure 27:
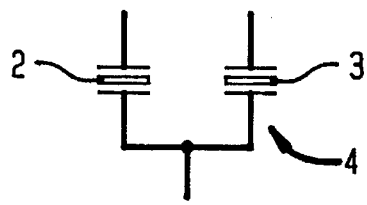
FIG. 27 illustrates a vibrator display.

FIG. 1 illustrates Example 1 of the invention. The vibration of a vibrator 4 constructed by forming piezo-electric element 5 on one side of vibration member 1 having a resonance point, as shown in FIG. 25, is controlled. One electrode of the piezo-electric element 5 is connected to the feedback input terminal 12 of feedback amplifier 10 and the other electrode is grounded. Signal input terminal 11 of feedback amplifier 10 is also connected to signal output terminal 9 of drive apparatus 6 and supplies a drive signal to input terminal 14 of drive apparatus 6. Furthermore, feedback resistance Rf is connected between the output terminal and the input terminal 12 of feedback amplifier 10.

For this example, output $V_F$ of feedback amplifier 10 becomes $$\frac{V_F}{V_{DR}} = 1 \frac{R_f}{R_l} + j2\pi f_s C_d R_f \quad (1)$$

at the mechanical series resonance frequency $F_s$ of vibrator 4 relative to signal output $V_{DR}$ of drive apparatus 6. Here, with, for example, damping capacity $C_d$ being on the order of 500 pF, resistance R1 being on the order of 5 kΩ and damping capacity $C_d$ being negligible relative to feedback voltage gain |A|, the practical equivalent constant of vibrator 4 is $$|A| \approx 1 + \frac{R_f}{R_1} \quad (2)$$

Consequently, the feedback voltage gain |A| obtains its maximum value at a frequency where it is in near agreement with the mechanical series resonance frequency $f_s$.

Figure 2:
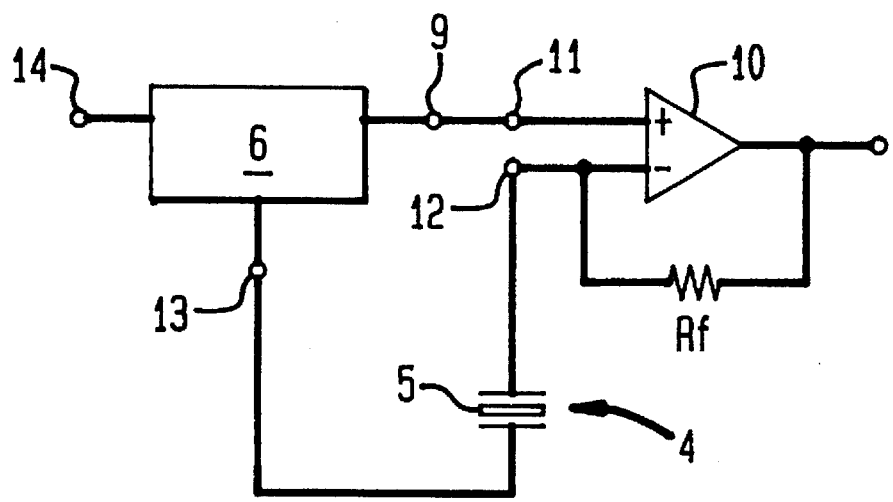
FIG. 2 illustrates Example 2 of the invention.

FIG. 2 illustrates Example 2 of the invention. The apparatus of this example controls the vibration of a vibrator 4, as in FIG. 1, but uses a drive apparatus 6 having compensation signal output terminal 13 that outputs the damping capacity compensation signal of vibrator 4. This compensation signal output terminal 13 is connected to the other electrode side of piezo-electric element 5. Here, compensation signal output terminal 13 outputs a compensation signal that erases the term $(1+j2\pi f_s C_d R_f)$ in Equation 1 above.

Consequently, in Example 2, at the mechanical series resonance frequency $f_s$ of vibrator 4, the feedback voltage gain |A| of feedback amplifier 10 becomes $$|A| = 1 + \frac{R_f}{R_1} \quad (3)$$

and a maximum value is reached at a frequency that accurately agrees with mechanical series resonance frequency $f_s$.

Figure 3:
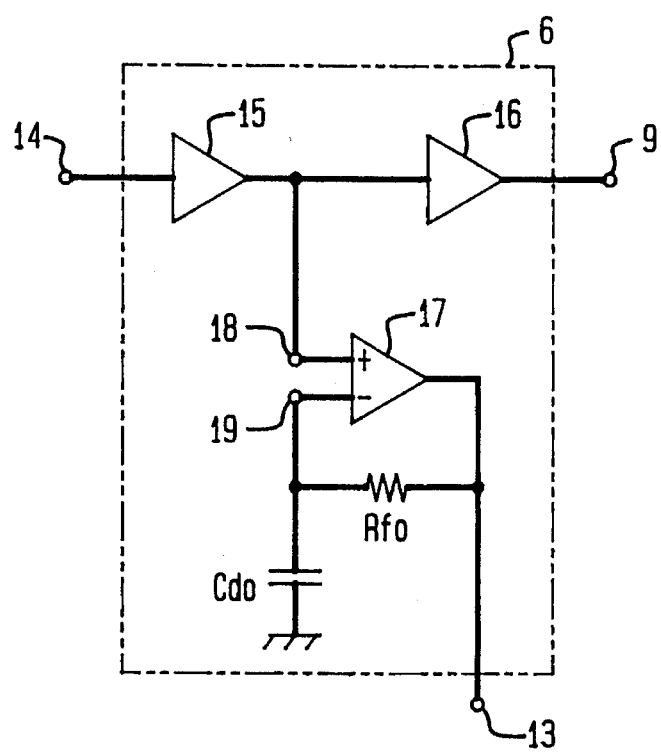
FIG. 3 illustrates an example of a drive apparatus.

FIG. 3 illustrates an example of a drive apparatus 6 having the compensation signal output terminal 13, as shown in FIG. 2. This drive apparatus 6 has amplifiers 15 and 16, feedback amplifier 17 and capacitor $Cd_o$. Input terminal 14 of the drive apparatus 6 is connected to the input side of amplifier 15. The output side of this amplifier 15 is connected to the input side of amplifier 16, while also being connected to signal input terminal 18 of feedback amplifier 17. The output of amplifier 16 is connected to signal output terminal 9 of drive apparatus 6. Feedback input terminal 19 of feedback amplifier 17 is grounded via capacitor $Cd_o$. Feedback resistance $Rf_o$ is connected between feedback input terminal 19 and the output side of feedback amplifier 17, i.e., compensation signal output terminal 13.

In drive apparatus 6, as shown in FIG. 3, the output voltage Vc of feedback amplifier 17 relative to the signal output voltage $V_{DR}$ at the mechanical series resonance frequency $f_s$ becomes $$\frac{V_c}{V_{DR}} = 1 + j2\pi f_s C_d R_f \quad (4)$$

Consequently, by properly setting capacitor $Cd_o$ and feedback resistance $Rf_o$, i.e., $Cd_o Rf_o = CdRf$, it is possible to realize Equation 3 above.

A suitable capacitor $Cd_o$ used here will have nearly the same temperature dependence as damping capacity Cd of vibrator 4. Preferably, the capacitor has the same composition as piezo-electric elements 2 and 3, so that it agrees in temperature dependency with the damping capacity Cd of vibrator 4. This latter is preferred because of the point that the vibrator is vibrated stabilized at a frequency in more accurate agreement with the mechanical series resonance frequency $f_s$, without being affected by changes in ambient temperature.

Figure 4:
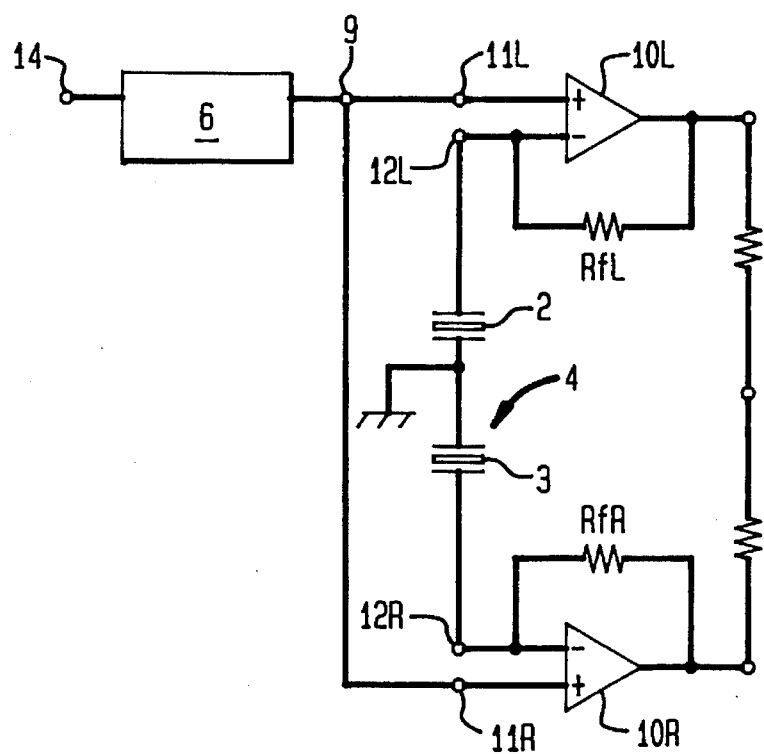
FIG. 4 illustrates Example 3 of the invention.

FIG. 4 illustrates Example 3 of the invention which is capable of detecting the angular velocity. The vibrator 4 is made by forming at least two piezo-electric elements 2 and 3 on the side surfaces of vibrator members 1 of various cross-sectional shapes and having resonance points, as shown in FIGS. 19 to 24. The signal output terminal 9 of drive apparatus 6 is connected to signal input terminals 11L and 11R, respectively, of feedback amplifiers 10L and 10R. Feedback input terminals 12L and 12R of feedback amplifier 10L and 10R are respectively connected to the electrodes on one side each of piezo-electric elements 2 and 3, while the electrodes on the other sides are grounded. The outputs of feedback amplifiers 10L and 10R are combined by connections through resistances. The respective feedback resistances $Rf_L$ and $Rf_R$ connections are made between the outputs of each feedback amplifier 10L and 10R and the corresponding signal input terminals 11L and 11R.

Figure 5A:
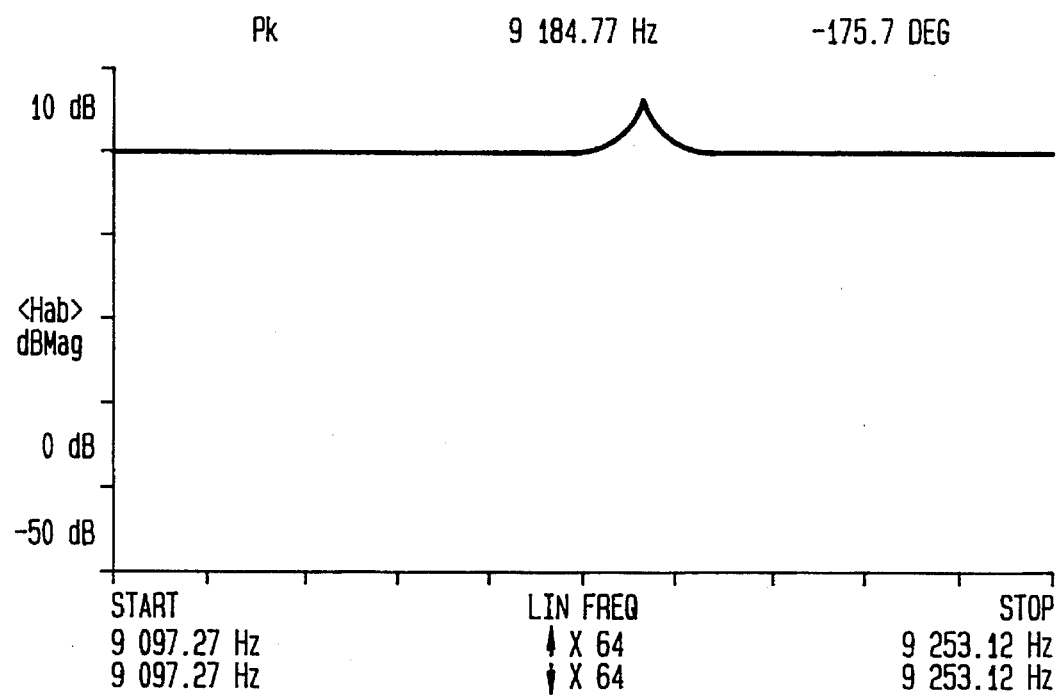
FIG. 5 illustrates an example of measurements of transfer and phase characteristics for the embodiment of FIG. 4.
Figure 5B:
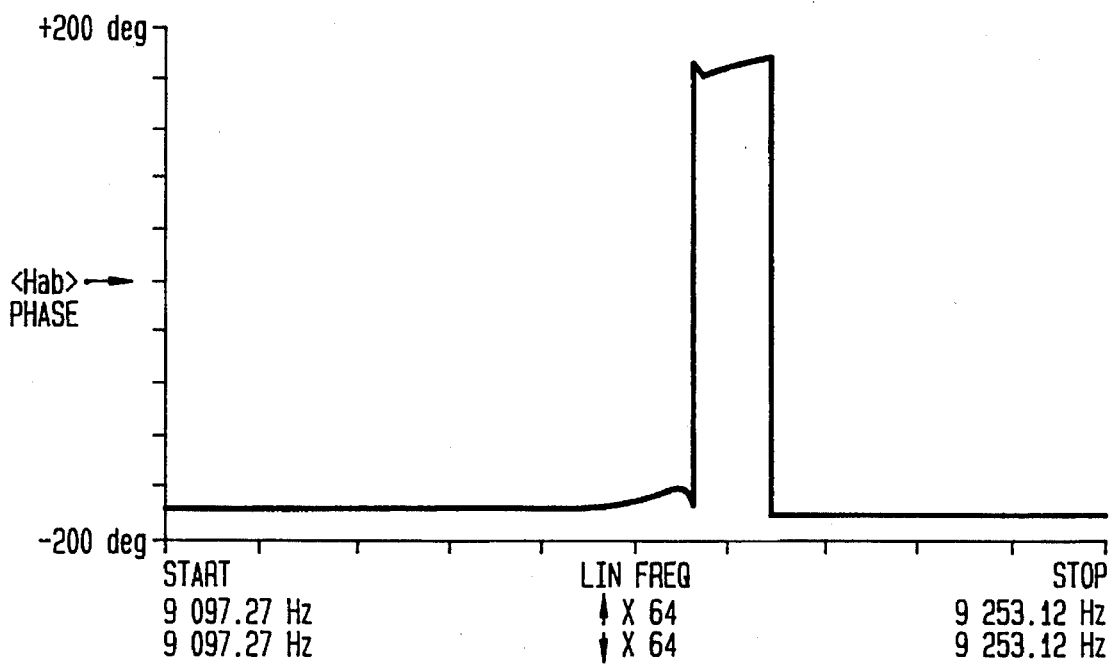

Similarly to FIG. 1, it is possible to obtain maximum values for the respective feedback voltage gains $|A_L|$ and $|A_R|$ of feedback amplifiers 10L and 10R at a frequency that is in near agreement with the mechanical series resonance frequency $f_s$. Results of measuring the transfer and phase characteristics of the combined output of amplifiers 10L and 10R are illustrated in FIGS. 5A and B, using the same measurements used in FIGS. 28 and 29.

Figure 6:
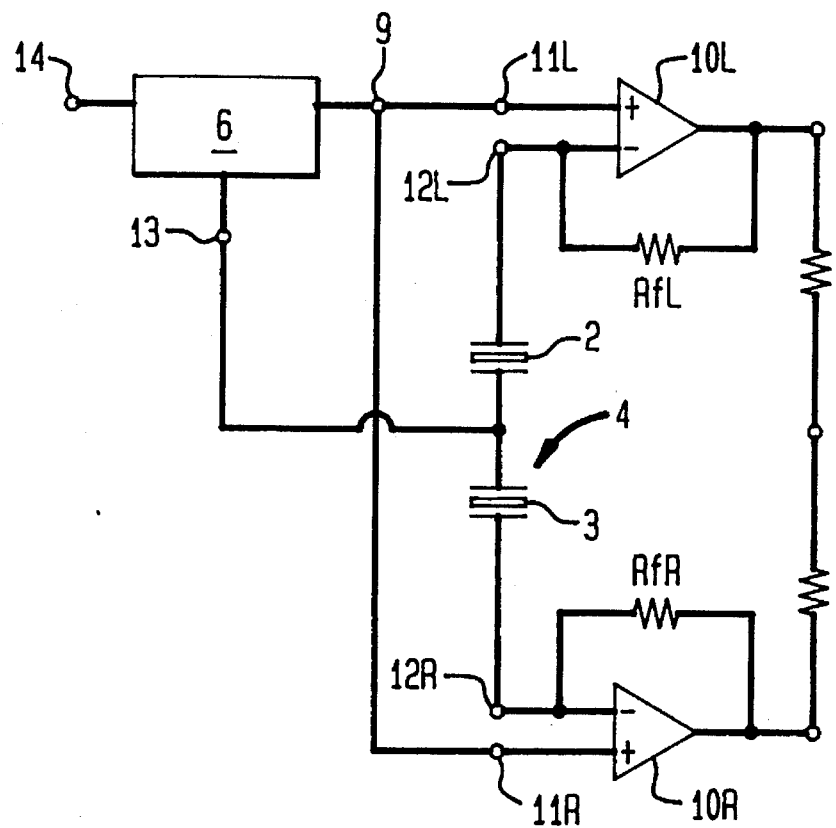
FIG. 6 illustrates Example 4 of the invention.

FIG. 6 illustrates Example 4 of the invention. In this example, vibration is controlled in a vibrator 4 identical to that of FIG. 4, except that it uses compensation signal terminal 13 for drive apparatus 6, as shown in FIG. 2. The compensation signal output terminal 13 is connected to the other electrodes of piezo-electric elements 2 and 3. It is possible to erase each term $(1+j2\pi f_s C_d R_f)$ from Equation 1 showing the feedback voltage gain of feedback amplifiers 10L and 10R corresponding to piezo-electric elements 2 and 3, at the mechanical series resonance frequency $f_s$ of vibrator 4, as in FIG. 2. Consequently, it is possible to obtain maximum values for feedback voltage gains $|A_L|$ and $|A_R|$ of feedback amplifiers 10L and 10R at a frequency that accurately agrees with the mechanical series resonance frequency $f_s$ of vibrator 4.

Figure 7:
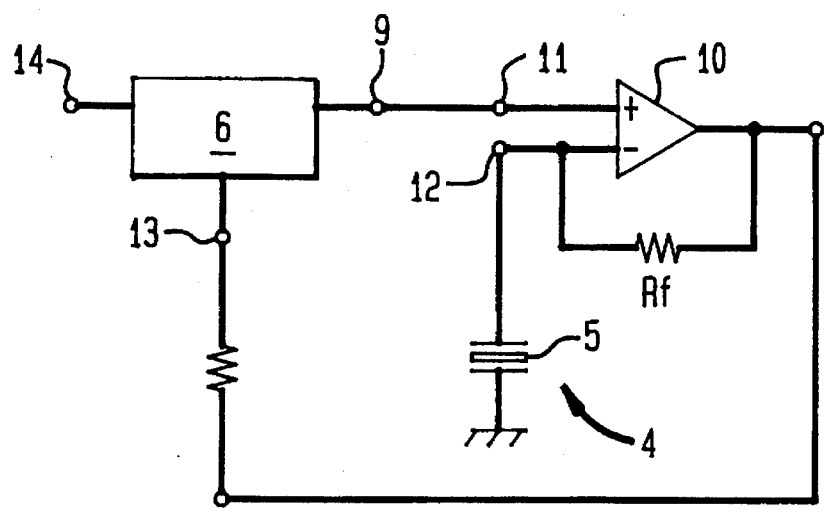
FIG. 7 illustrates Example 5 of the invention.

FIG. 7 illustrates Example 5 of the invention. This example is similar to FIG. 1, except that it uses a compensation signal output terminal 13, so that the compensation signal output is combined with the output of feedback amplifier 10. By thus combining the compensation signal of the drive apparatus 6 and the output of feedback amplifier 10, it is possible to obtain the maximum value of feedback voltage gain |A| of feedback amplifier 10 at a frequency that accurately agrees with the mechanical series resonance frequency $f_s$ of vibrator 4, as in FIG. 2.

Figure 8:
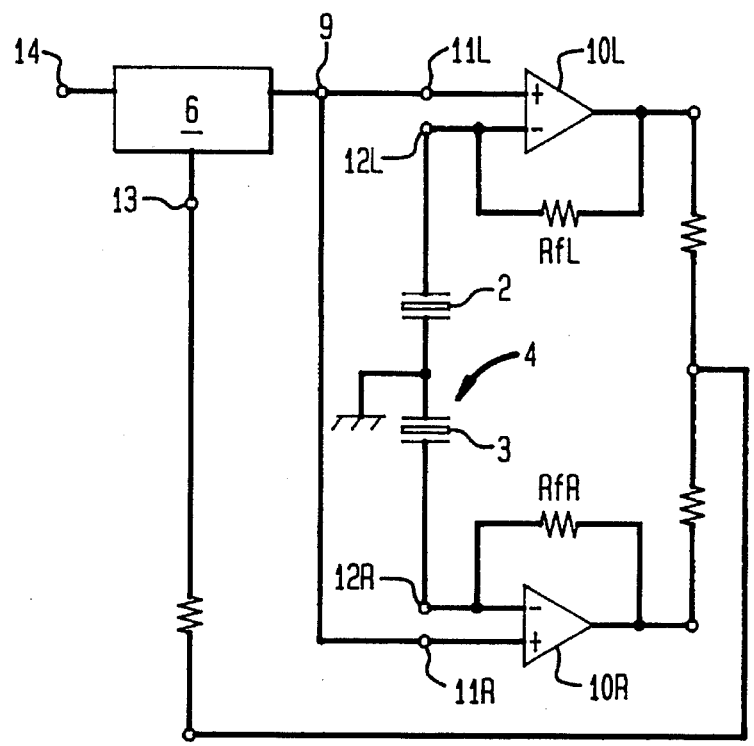
FIG. 8 illustrates Example 6 of the invention.
Figure 9A:
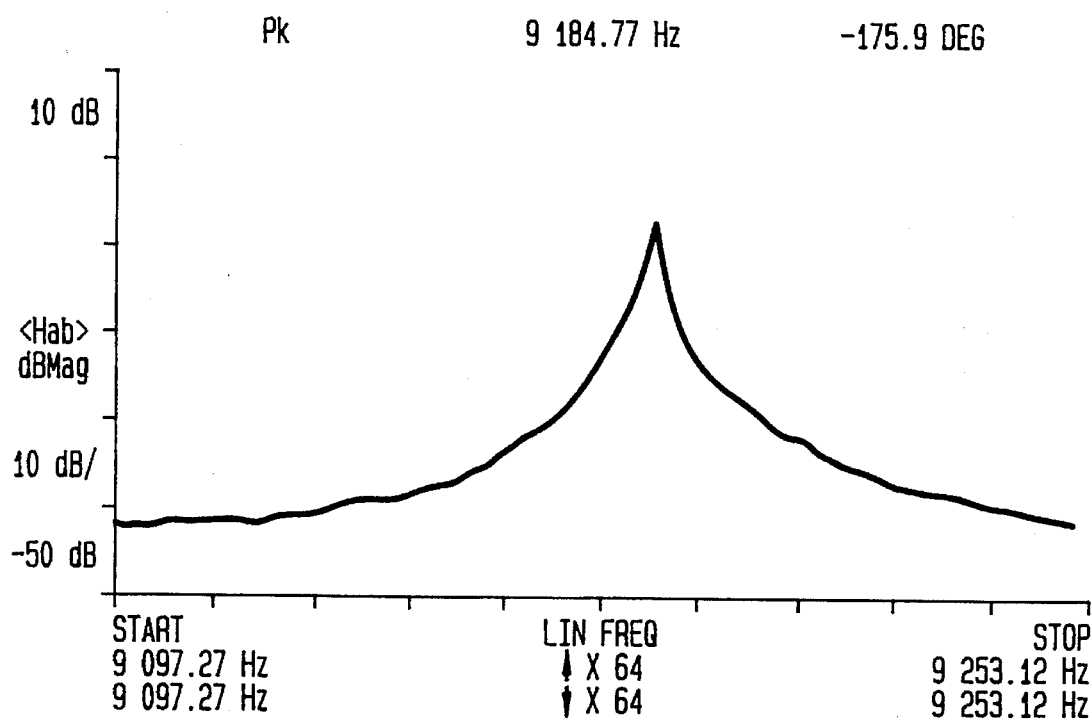
FIG. 9 illustrates an example of measurements of transfer and phase characteristics for the embodiment of FIG. 8.
Figure 9B:
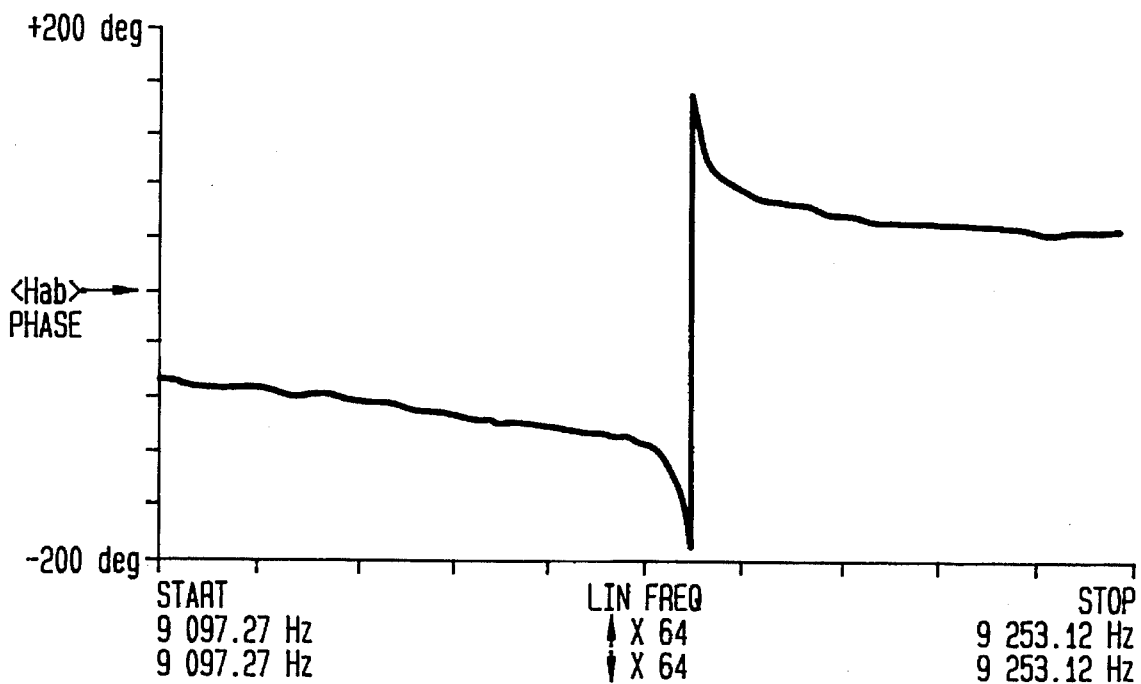

FIG. 8 illustrates Example 6 of the invention. This example is similar to FIG. 4 except a compensation signal output terminal 13 is provided, so that the compensation signal is combined with the outputs of feedback amplifiers 10L and 10R. It is possible to obtain the maximum value for the combined output of the compensation signal output of drive apparatus 6 and the outputs of feedback amplifiers 10L and 10R at a frequency in accurate agreement with the mechanical series resonance frequency $f_s$ of vibrator 4, as in FIG. 6. The results of measuring the transfer and phase characteristics of the outputs of amplifiers 10L and 10R combined with the compensation signal output of drive apparatus 6 are illustrated in FIGS. 9A and B, using the same measurements as in FIG. 28 and FIG. 29.

Figure 10:
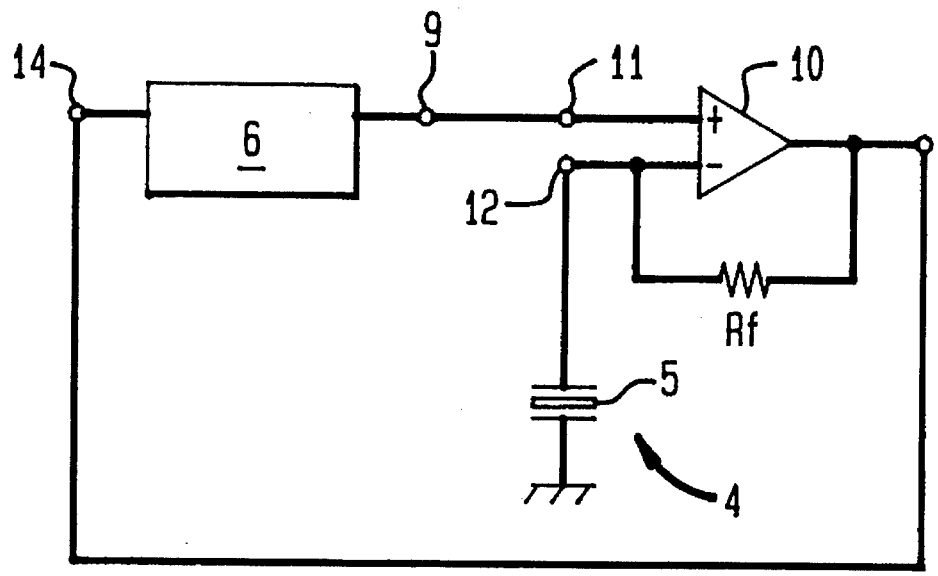
FIG. 10 illustrates Example 7 of the invention.
Figure 11:
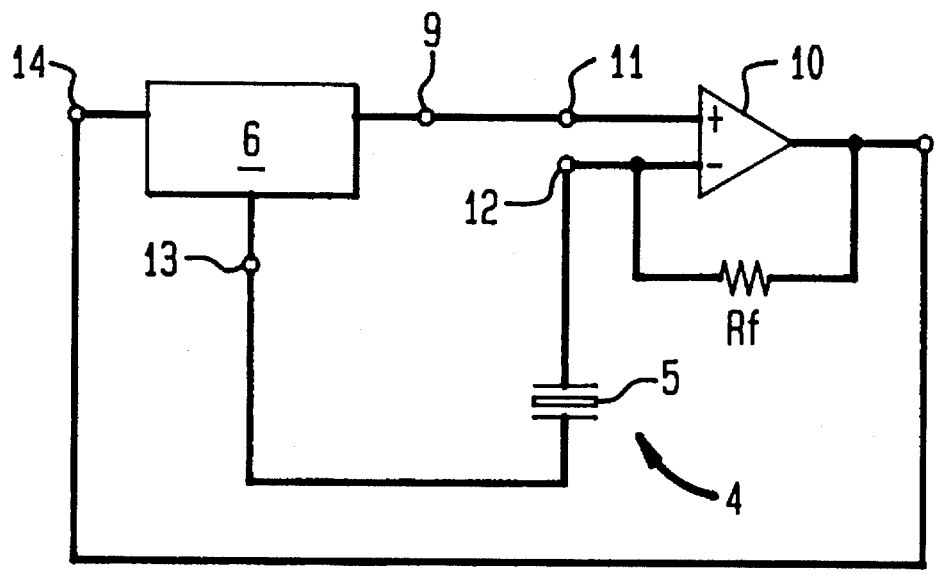
FIG. 11 illustrates Example 8 of the present invention.
Figure 12:
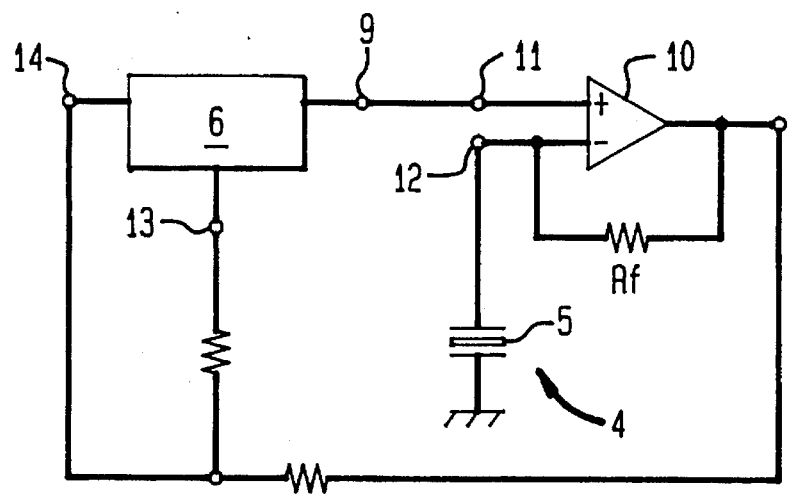
FIG. 12 illustrates Example 9 of the present invention.

FIG. 10, FIG. 11 and FIG. 12 respectively illustrate Examples 7, 8 and 9 of the invention. These examples are similar to FIG. 1, FIG. 2 and FIG. 3, respectively, except the output of feedback amplifier 10 is connected to input terminal 14 of drive apparatus 6, so that vibrator 4 is given self-oscillating or self-induced vibration. It is possible to have stabilized self-oscillating or self-induced vibration at the frequencies where the output of feedback amplifier 10 reaches maximum values as explained by FIG. 1, FIG. 2 and FIG. 3, i.e., at,a frequency in near agreement with the mechanical series resonance frequency $f_s$ in FIG. 10 and at a frequency in accurate agreement with the mechanical series resonance frequency $f_s$ of vibrator 4 in FIG. 11 and FIG. 12.

Figure 13:
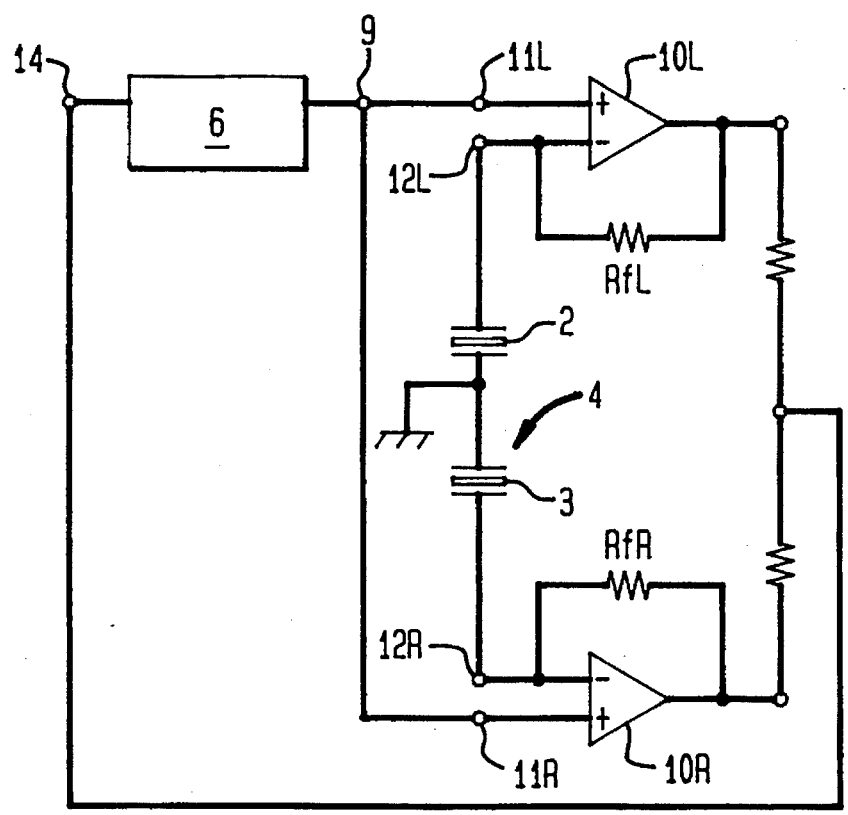
FIG. 13 illustrates Example 10 of the present invention.
Figure 14:
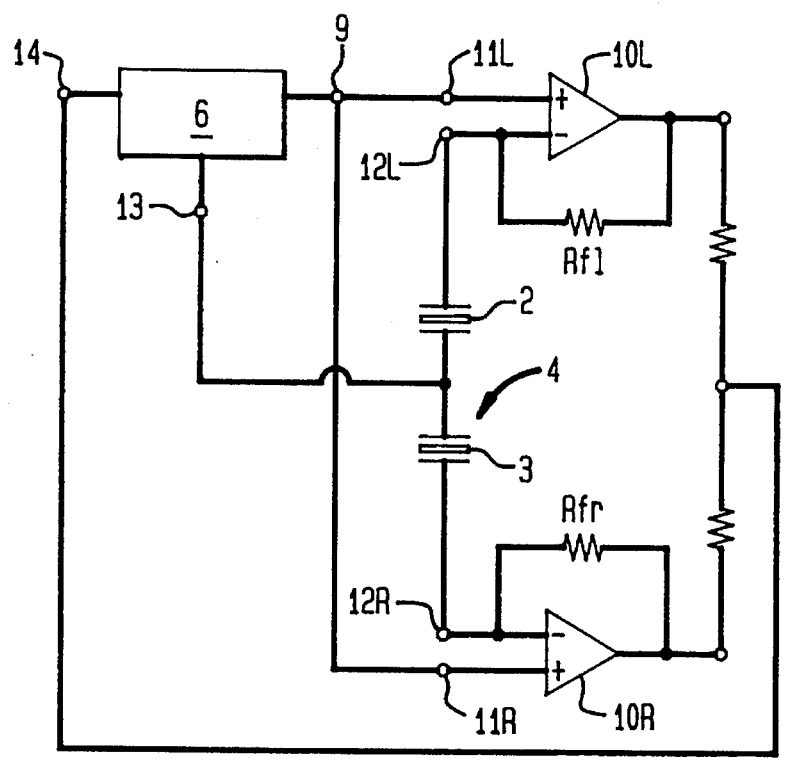
FIG. 14 illustrates Example 11 of the present invention.
Figure 15:
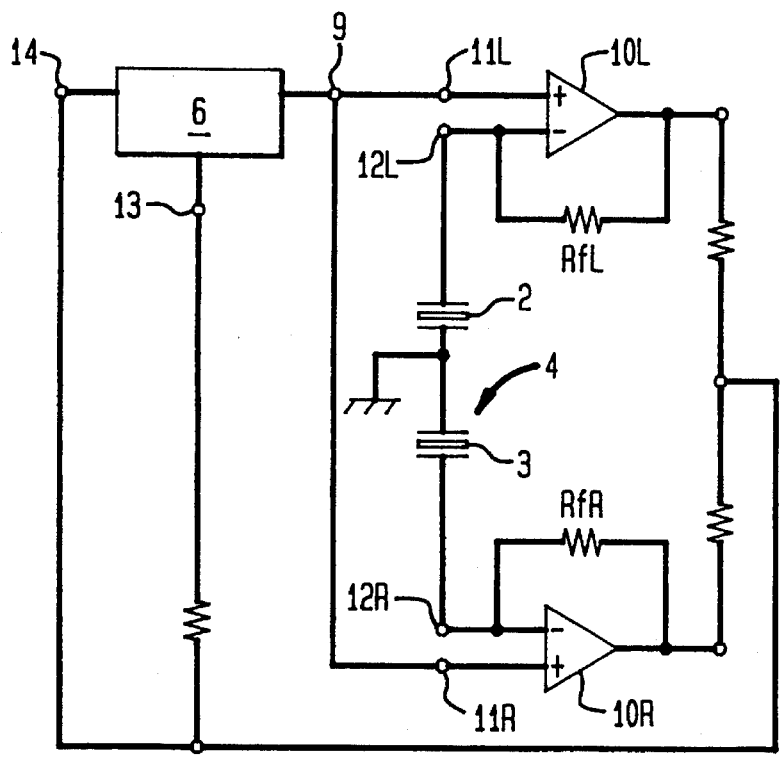
FIG. 15 illustrates Example 12 of the present invention.

FIG. 13, FIG. 14 and FIG. 15 illustrate Examples 10, 11 and 12 of the invention, respectively. These are similar to FIG. 4, FIG. 6 and FIG. 8, respectively, except self-oscillating vibration is given to vibrator 4 by supplying the combined output of feedback amplifiers 10L and 10R to input terminal 14 of drive apparatus 6. Here, it is possible to have stabilized self-oscillating vibration at the frequencies where the combined output of feedback amplifiers. 10L and 10R reach maximum values as explained by FIG. 4, FIG. 6 and FIG. 8, i.e., at frequencies in near agreement with the mechanical series resonance frequency $f_s$ of vibrator 4 in FIG. 13 and at frequencies in accurate agreement with the mechanical series resonance frequency $f_s$ of vibrator 4 in FIG. 14 and FIG. 15.

Figure 16:
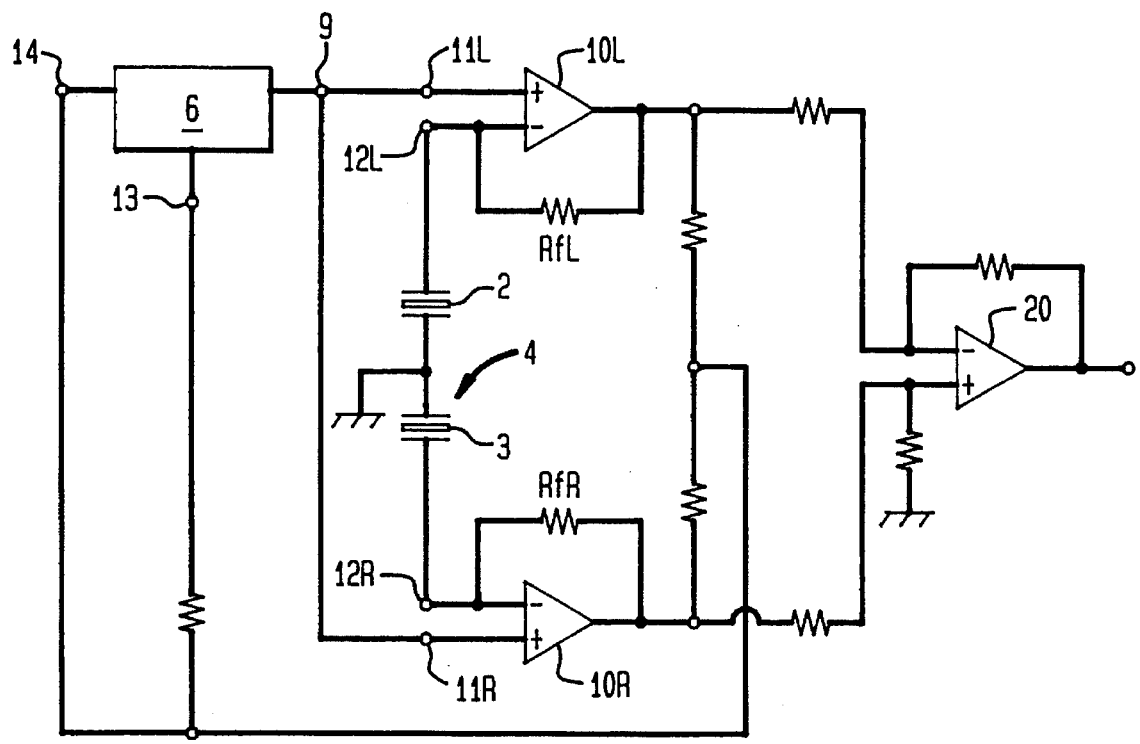
FIG. 16 illustrates Example 13 of the present invention.
Figure 17:
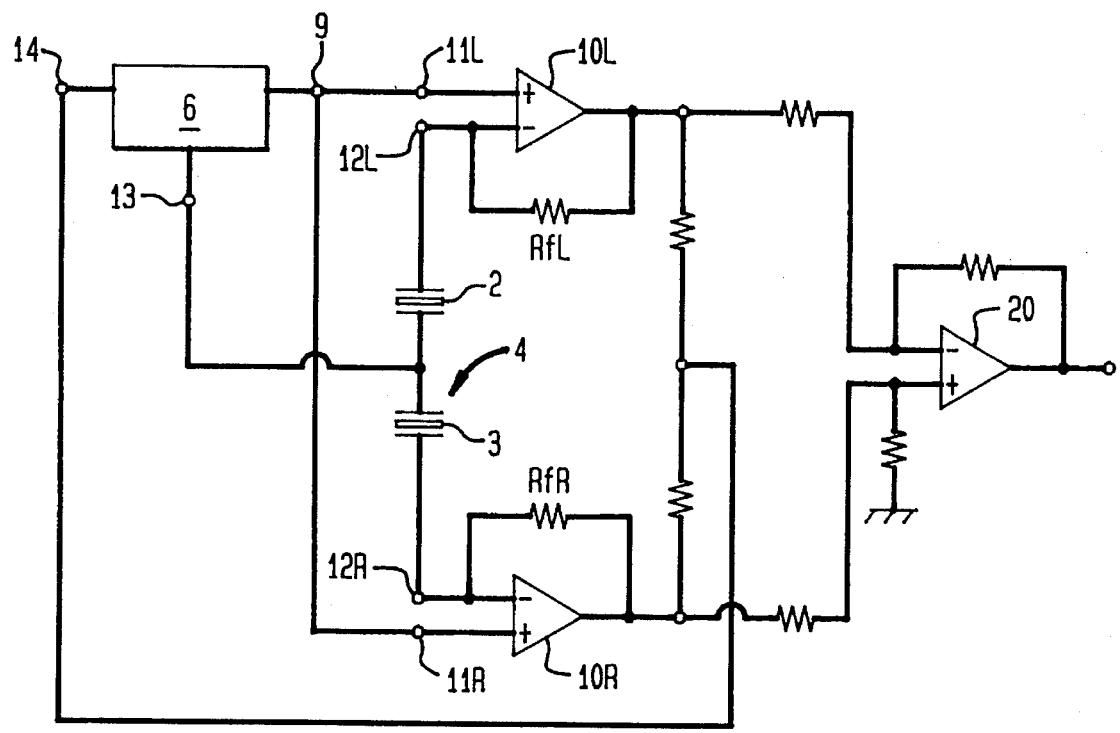
FIG. 17 illustrates Example 14 of the present invention.
Figure 18:
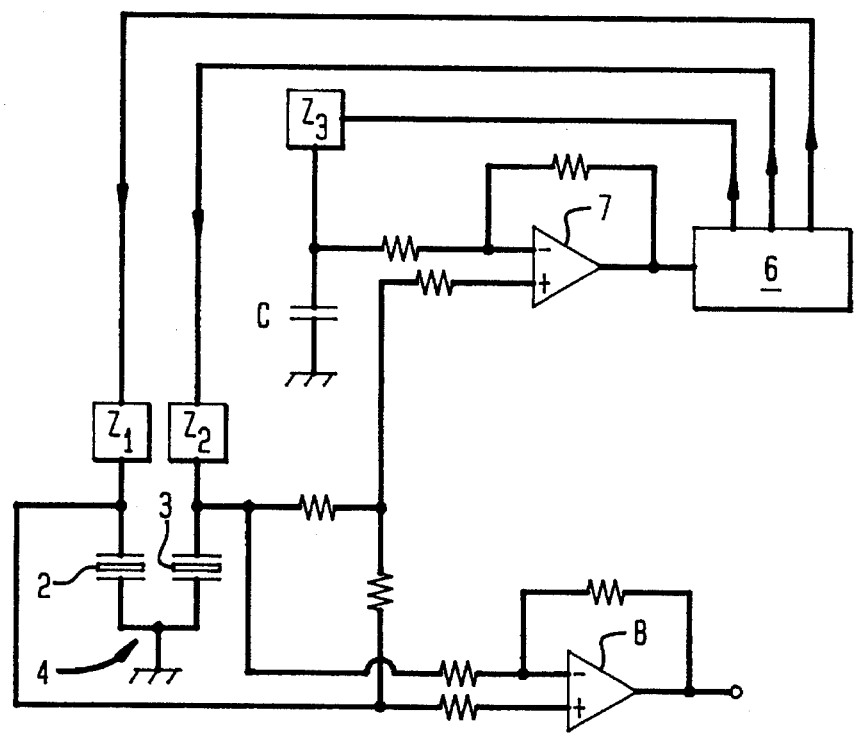
FIG. 18 illustrates a conventional vibration control device.
Figure 19:
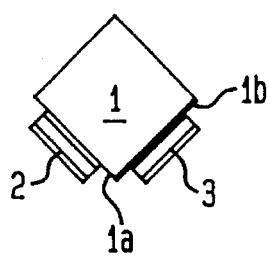
FIGS. 19–25 illustrate examples of vibrators used in this invention.
Figure 23:
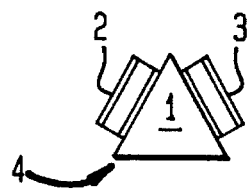
Figure 20:
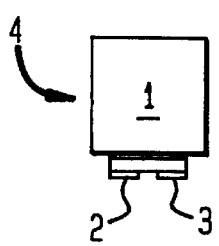
Figure 24:
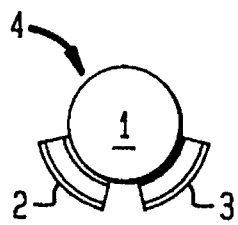
Figure 21:
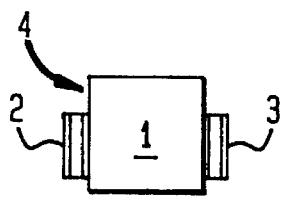

FIG. 16 and FIG. 17 respectively illustrate Examples 13 and 14 of the invention. These are similar to FIG. 15 and FIG. 14, respectively, except a differential amplifier 20 is added for obtaining the differential outputs of feedback amplifiers 10L and 10R. In these examples, it is possible to have self-oscillating vibration by stabilizing vibrator 4 at frequencies that are in accurate agreement with the mechanical series resonance frequency $f_s$. When vibrator 4 is given angular velocity under this self-oscillating vibration state, it is possible to detect the Coriolis force created thereby as the voltage from differential amplifier 20.

Also in FIGS. 16 and 17, even if the mechanical quality coefficient $Q_m$ of vibrator 4 does not accurately agree with the observed value at the piezo-electric element 2 and the observed value at the piezo-electric element 3, the frequency of self-oscillating vibration does agree accurately with the mechanical series resonance frequency $f_s$ of vibrator 4, so that the output accompanying the Coriolis force of differential amplifier 20, i.e., the formation of low voltage and fluctuation, can be slightly suppressed.

Figure 31:
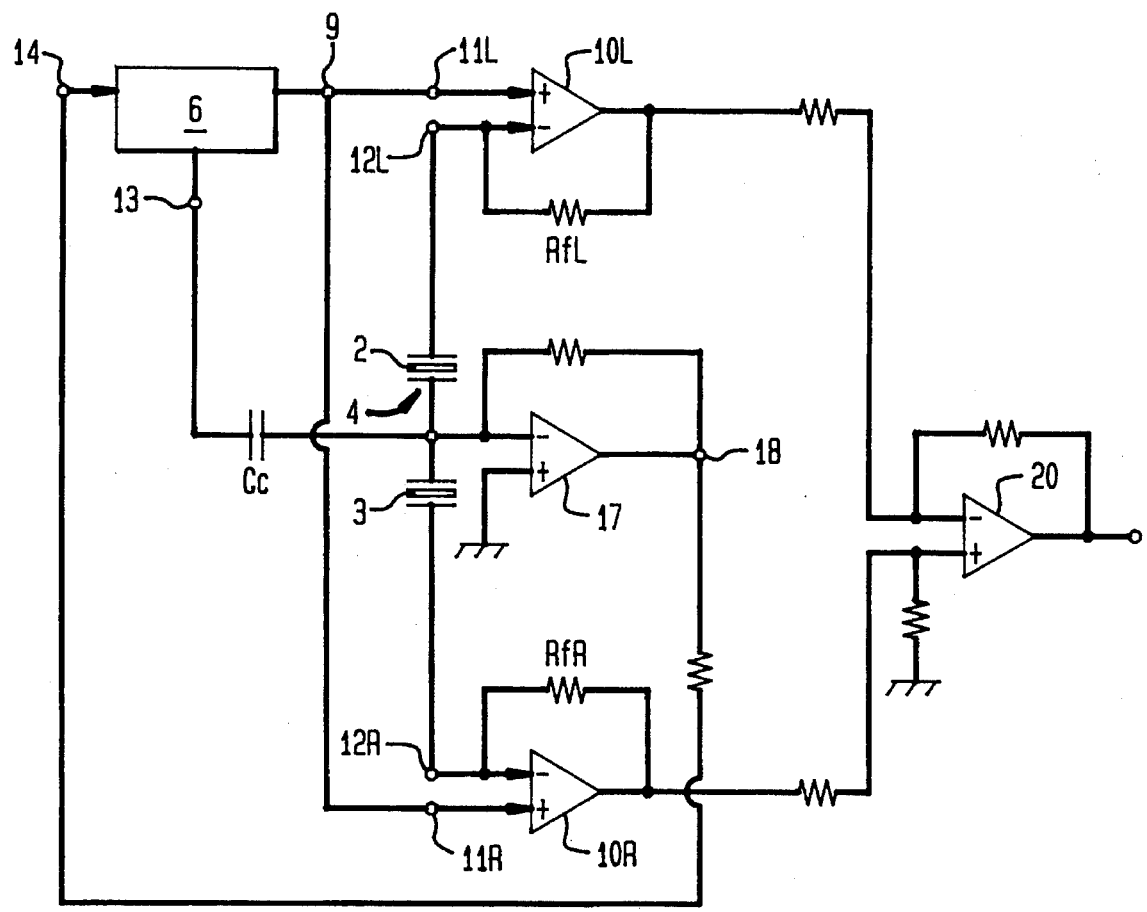
FIG. 31 illustrates an Example 15 of the invention.

FIG. 31 illustrates Example 15 of the invention wherein the Coriolis force created by the angular velocity of the vibrator is detected. The signal output terminal 9 of drive apparatus 6 is connected, respectively, to signal input terminals 11L and 11R of feedback amplifiers 10L and 10R. The feedback input terminals 12L and 12R of the feedback amplifiers 10L and 10R are each connected to one electrode of piezo-electric elements 2 and 3. The other electrodes of piezo-electric elements 2 and 3 are connected via capacitor Cc to compensation signal output terminal 13 of drive apparatus 6 which outputs the compensation signal for the damping capacity of vibrator 4. Thus, the compensation signal is combined with the signals of the other electrodes of piezo-electric elements 2 and 3. This combined signal is amplified by integrating amplifier 17. Output terminal 18 of the integrating amplifier 17 is connected to input terminal 14 of drive apparatus 6, so that the vibrator 4 is given self-oscillation vibration. Preferably, capacitor Cc has a temperature dependence corresponding to the temperature dependence of damping capacity Cd of vibrator 4. It is particularly preferred to use a capacitor having a composition identical to those of piezo-electric elements 2 and 3, so that it agrees with the temperature dependence of damping capacity Cd of vibrator 4.

The outputs of feedback amplifiers 10L and 10R are supplied to differential amplifier 20. Thus, the Coriolis force created by the angular velocity acting on vibrator 4 is detected as voltage. Furthermore, feedback resistances $Rf_L$ and $Rf_R$ are connected between the output of each feedback amplifier 10L and 10R and the corresponding feedback input terminals 12L and 12R sides. Preferably, the capacitor Cc has a temperature dependence corresponding to the temperature dependence of damping capacity $C_d$ of vibrator 4.

Figure 32:
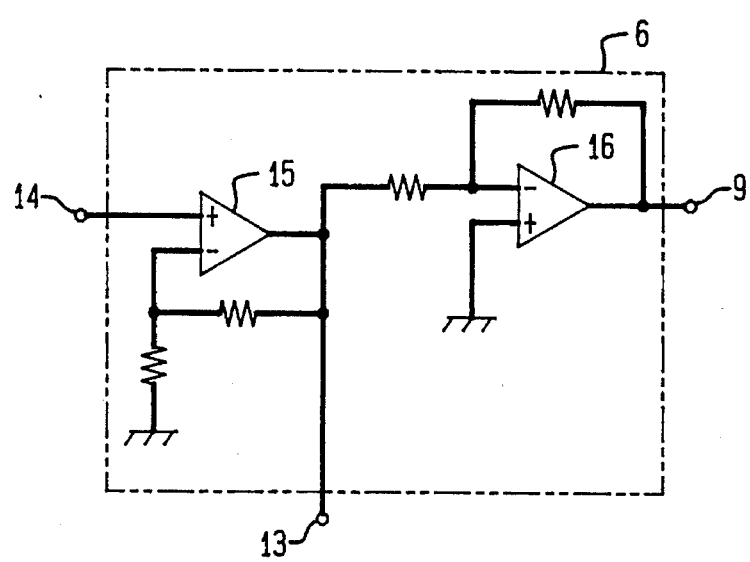
FIG. 32 illustrates an example of the drive apparatus illustrated in FIG. 31.

FIG. 32 illustrates an example of a drive apparatus 6 having the compensation signal output terminal 13 as illustrated in FIG. 31. This drive apparatus 6 has a non-inverting amplifier 15 and an inverting amplifier 16. The signal from input terminal 14 is amplified by non-inverting amplifier 15 and the output is supplied to compensation output terminal 13 as the compensation signal. The output of amplifier 15 is also amplified at inverting amplifier 16 and then supplied to signal output terminal 9 as the drive signal. In this example, the phases of the drive signal supplied to signal output terminal 9 and the compensation signal supplied to compensation signal output terminal 13 differ by 180°, while the amplitude ratio of the two signals is suitably set by inverting amplifier 16.

Figure 28A:
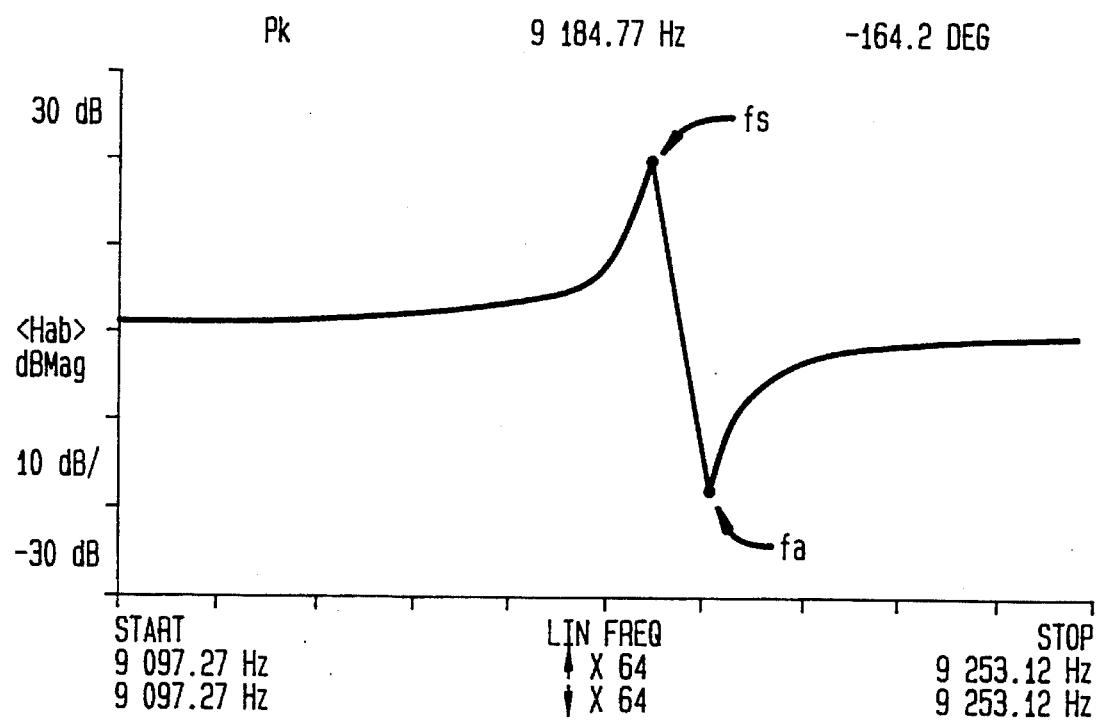
FIG. 28 illustrates an example of measurements of admittance frequency and phase characteristics.
Figure 28B:
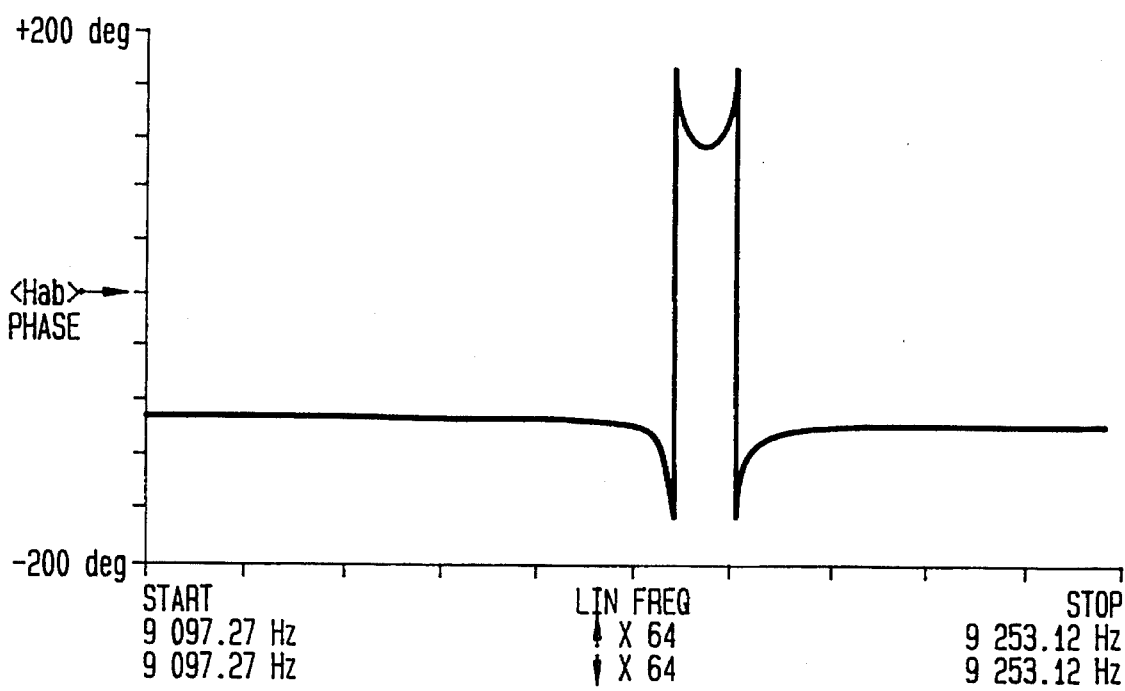
Figure 29A:
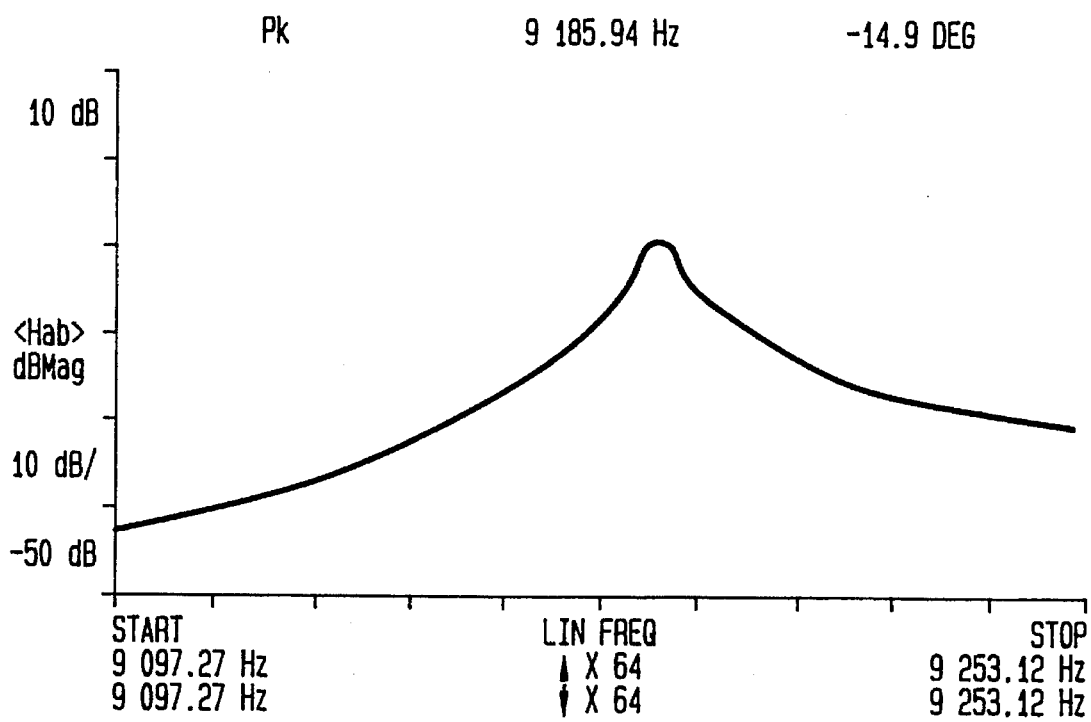
FIG. 29 illustrates an example of measurements of transfer and phase characteristics in a conventional control apparatus.
Figure 29B:
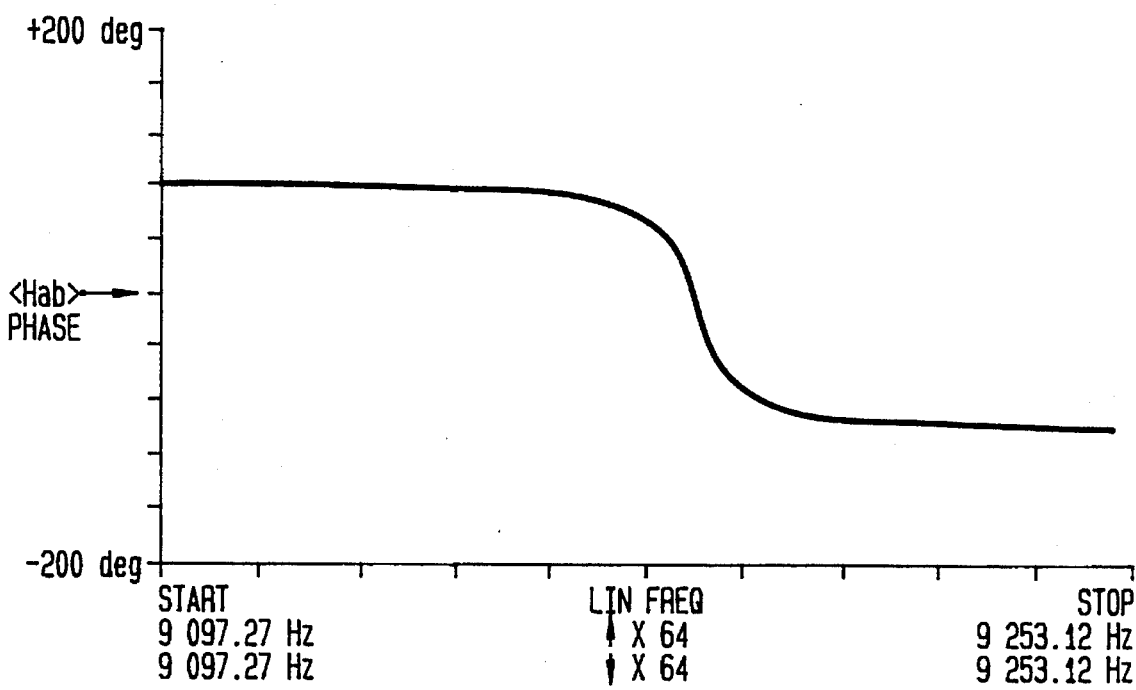
Figure 30:
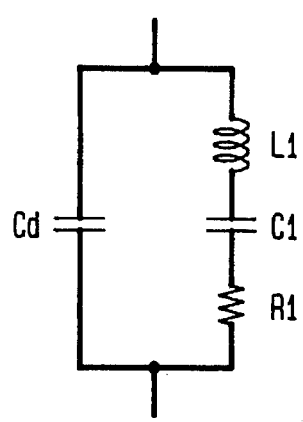
FIG. 30 illustrates an equivalent circuit for the vibrator.
Figure 33A:
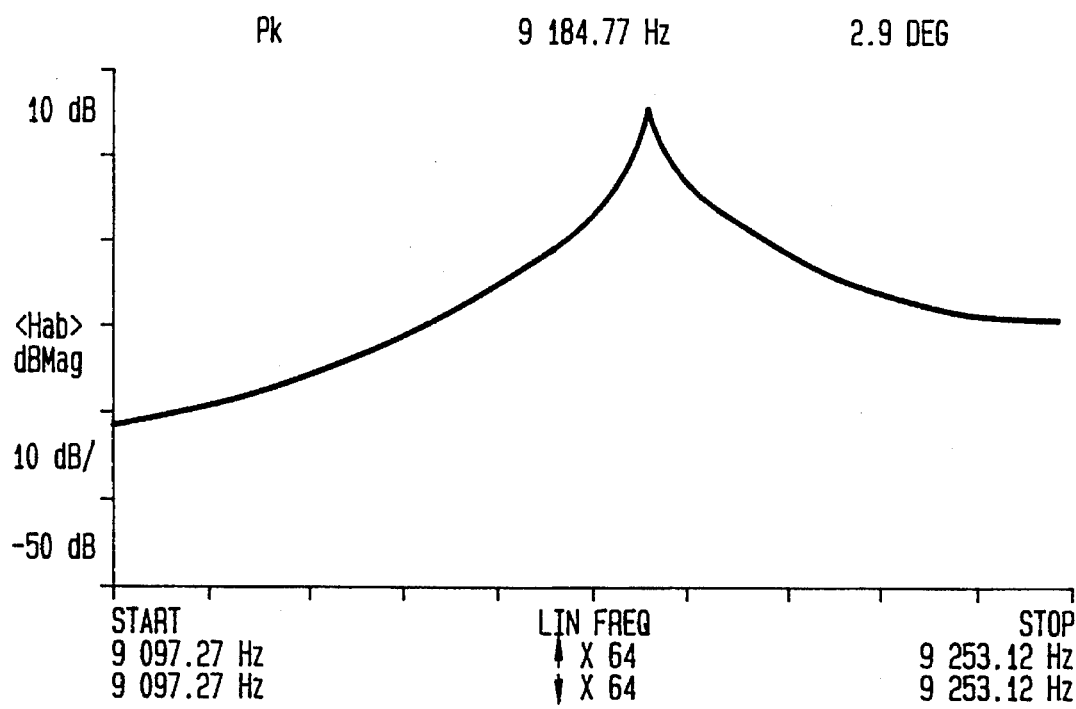
FIG. 33 illustrates measurements of transfer and phase characteristics of the cumulative amplifier in Example 15.
Figure 33B:
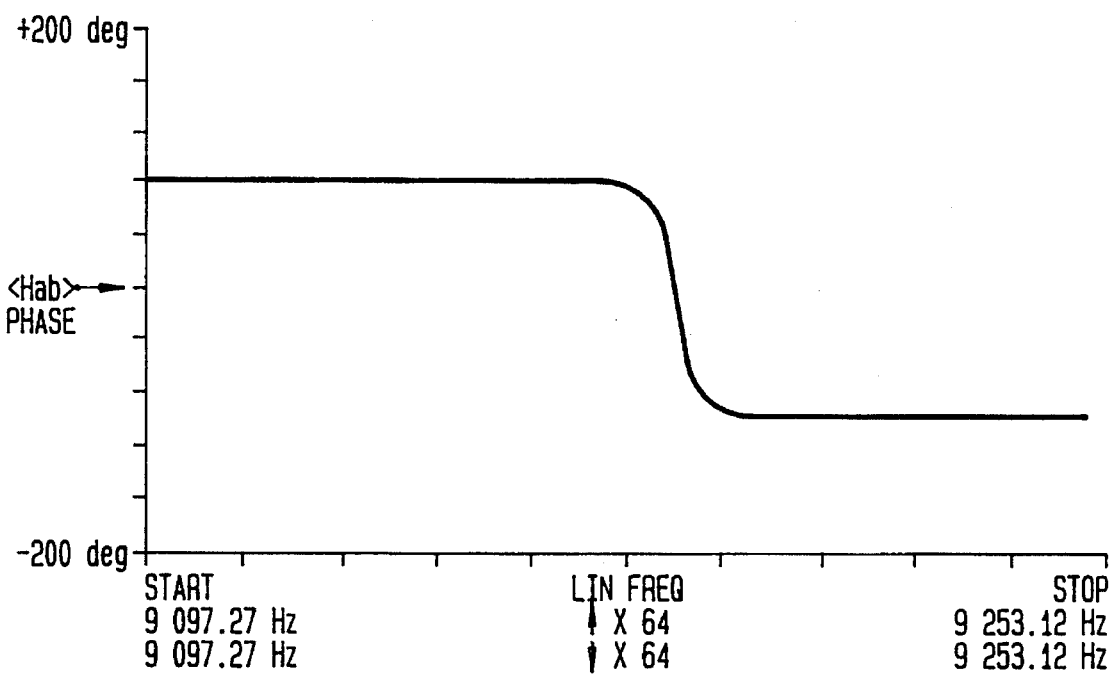

FIGS. 33A and B illustrate the results of measuring the transfer and phase characteristics of the output of cumulative amplifier 17 using the same vibrator 4 as used for measurements in FIG. 28 and FIG. 29.

The imaginary parts of the currents flowing in piezo-electric elements 2 and 3, relating to the respective damping capacities Cd, flow through capacitor Cc and are extinguished by the combined compensation signal. Therefore, the output of cumulative amplifier 17 becomes only the real part of the currents flowing in piezo-electric elements 2 and 3. Consequently, as will be apparent from the measurement results shown in FIGS. 33A and B, the voltage gain of integrating amplifier 17 maximizes at the mechanical series resonance frequency $f_s$ of vibrator 4. It is, therefore, possible to have self-excitation vibration by-stabilizing vibrator 4 in accurate agreement with the mechanical series resonance frequency $f_s$. Particularly, when the capacitor $C_c$ has an identical composition to the piezo-electric elements 2 and 3, it is possible to have the temperature dependence in agreement with the temperature dependence of damping capacity Cd of vibrator Therefore, greater stability of the self-oscillating vibration at this mechanical series resonance frequency $f_s$ is achieved.

Furthermore, when angular velocity acts on vibrator 4, with vibrator 4 being in a state of self-oscillation vibration, it is possible to detect the Coriolis force created as voltage from differential amplifier 20. Since vibrator 4 is given self-oscillating vibration at a frequency that accurately agrees with the mechanical series resonance frequency $f_s$, even if the mechanical quality coefficient $Q_m$ of vibrator 4 is not in accurate agreement with the values observed on either piezo-electric element 2 or piezo-electric element 3, the outputs that do not accompany the Coriolis force of the differential amplifier 20 can be slightly decreased. In other words, the formation of low voltage and fluctuations can be decreased.

Figure 34:
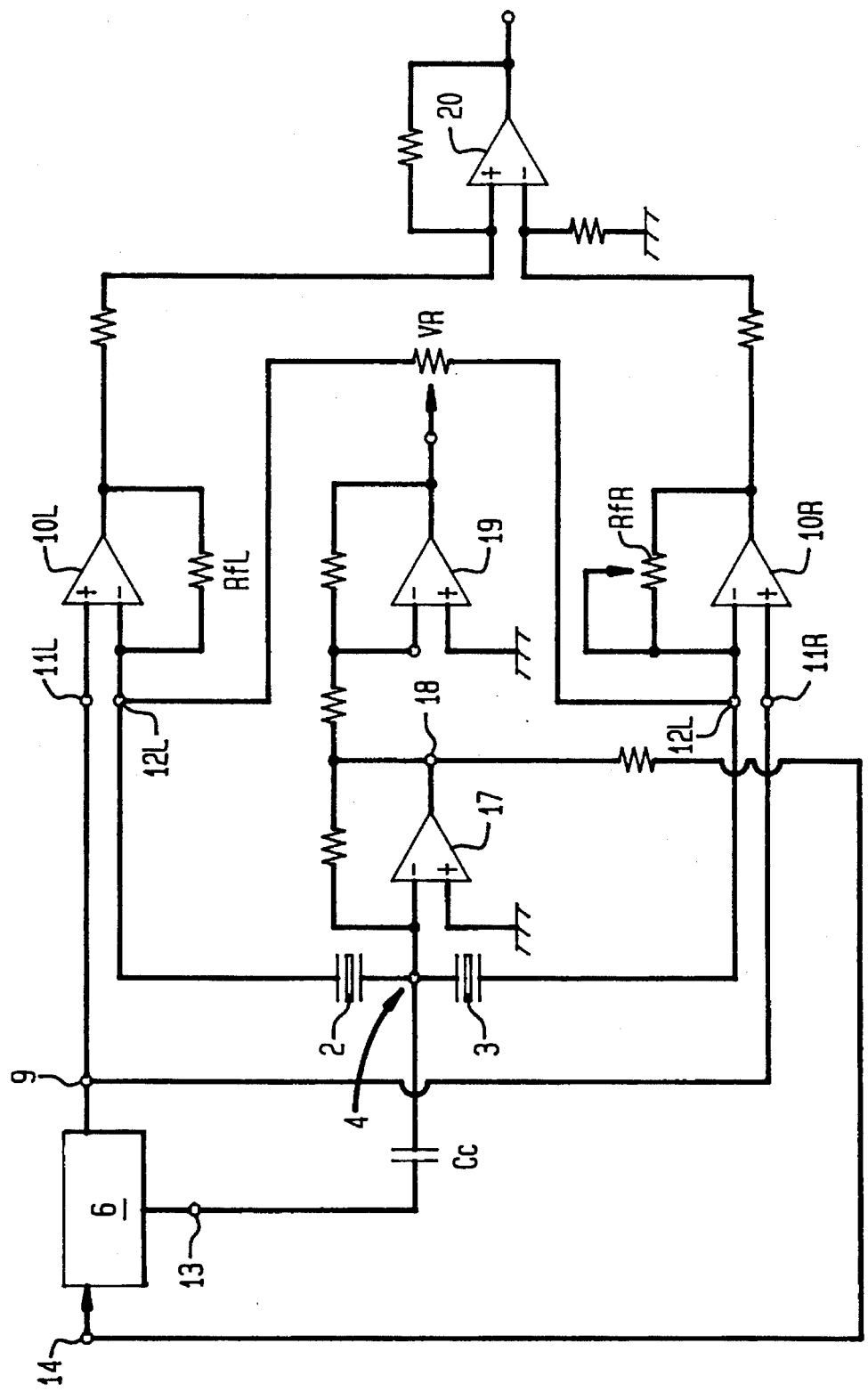
FIG. 34 illustrates Example 16 of the invention.

FIG. 34 illustrates Example 16 of the invention. At inverting amplifier 19 the combined signal output from integrating amplifier 17 is inversely amplified to be in-phase with the drive signal. The in-phase signal is then supplied via variable resistance VR to feedback input terminals 12L and 12R of feedback amplifiers 10L and 10R. At least one of the feedback resistances $Rf_L$ and $Rf_R$, in this example feedback resistance $Rf_R$, has a variable feedback resistance.

In this example, compensations for minute differences in the equivalent resistances of piezo-electric elements 2 and 3 are made by variable resistance VR, thereby sending real parts of the currents flowing in the equivalent resistances of piezo-electric elements 2 and 3 to feedback input terminals 12L and 12R. The current flowing in feedback resistances $Rf_L$ and $Rf_R$ becomes respectively equal to the current flowing in the corresponding damping capacities of piezo-electric elements 2 and 3. Also, minute differences from the damping capacities of piezo-electric elements 2 and 3 are compensated for by variable resistance $Rf_R$, so that the respective products of the imaginary parts of the currents flowing in the damping capacities of piezo-electric elements 2 and 3 and the corresponding feedback resistance $Rf_n$ and variable feedback resistance $Rf_R$, i.e., the voltages of the imaginary parts, become equal.

In Example 16, only a current corresponding to the Coriolis force, i.e., an imaginary part of the current and not a real part of the current, flows to feedback resistance $Rf_L$ and variable feedback resistance $RF_R$ of feedback amplifiers 10L and 10R. Therefore, even if the mechanical quality coefficient $Q_m$ of vibrator 4 is not in accurate agreement with the observed values at the piezo-electric element 2 and at the piezo-electric element 3, the output that does not accompany the Coriolis force of differential amplifier 20 can be more slightly suppressed. In other words, the formation of low voltage and flutuations can be suppressed. Consequently, the phase component of the input angular velocity can be effectively amplified in feedback amplifiers 10L and 10R.

Accordingly, it is possible to effectively decrease the formation of low voltage in feedback amplifiers 10L and 10R while at the same time to effectively amplify the phase component corresponding to the input angular velocity. Consequently, it is possible to detect the angular velocity at differential amplifier 20 with a higher degree of accuracy. Furthermore, since this example effectively decreases formation of low voltage, the feedback resistance $Rf_R$ of one feedback amplifier 10R has a variable resistance.

Figure 35:
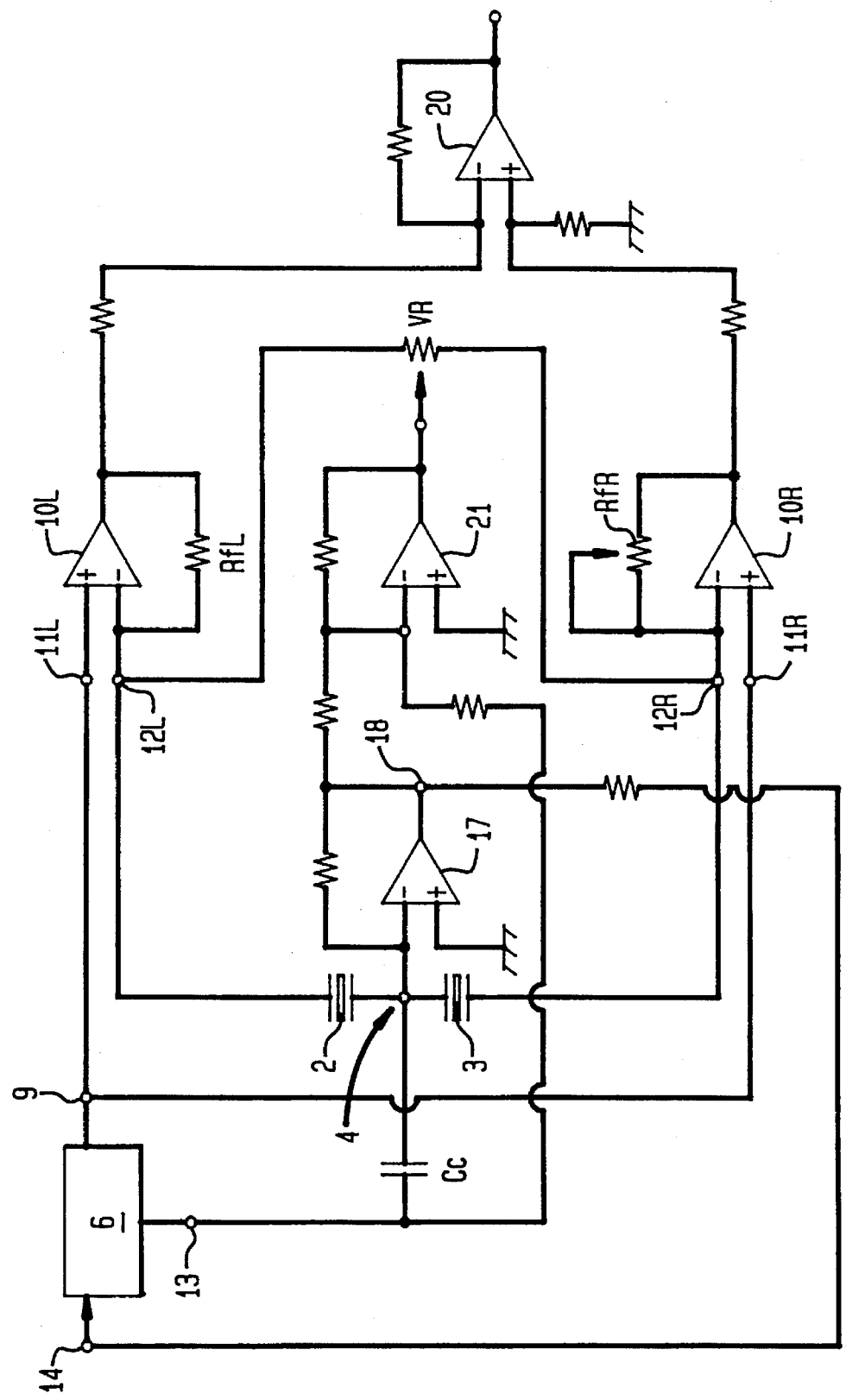
FIG. 35 illustrates Example 17 of the invention.

FIG. 35 illustrates Example 17 of the invention incorporating detection of angular velocity. This embodiment offers variations corresponding to the temperature dependence of the equivalent resistances of piezo-electric elements 2 and 3 to a signal in-phase with the drive signal of drive apparatus 6 which is supplied to the feedback input terminals 12L and 12R of feedback amplifiers 10L and 10R in Example 16, as illustrated in FIG. 34. The output of integrating amplifier 17 and the compensation signal from compensation signal output terminal 13 are combined and supplied to integrating amplifier 21. The output of integrating amplifier 21 compensates for slight differences in the equivalent resistances of piezo-electric elements 2 and 3 by means of variable resistance VR, as in FIG. 34. The output is supplied to feedback input terminals 12L and 12R of feedback amplifiers 10L and 10R. Furthermore, the imaginary number component for the damping capacities of piezo-electric elements 2 and 3 is adjusted by variable feedback resistance $Rf_R$ of feedback amplifier 10R, as in Example 16.

Figure 36A:
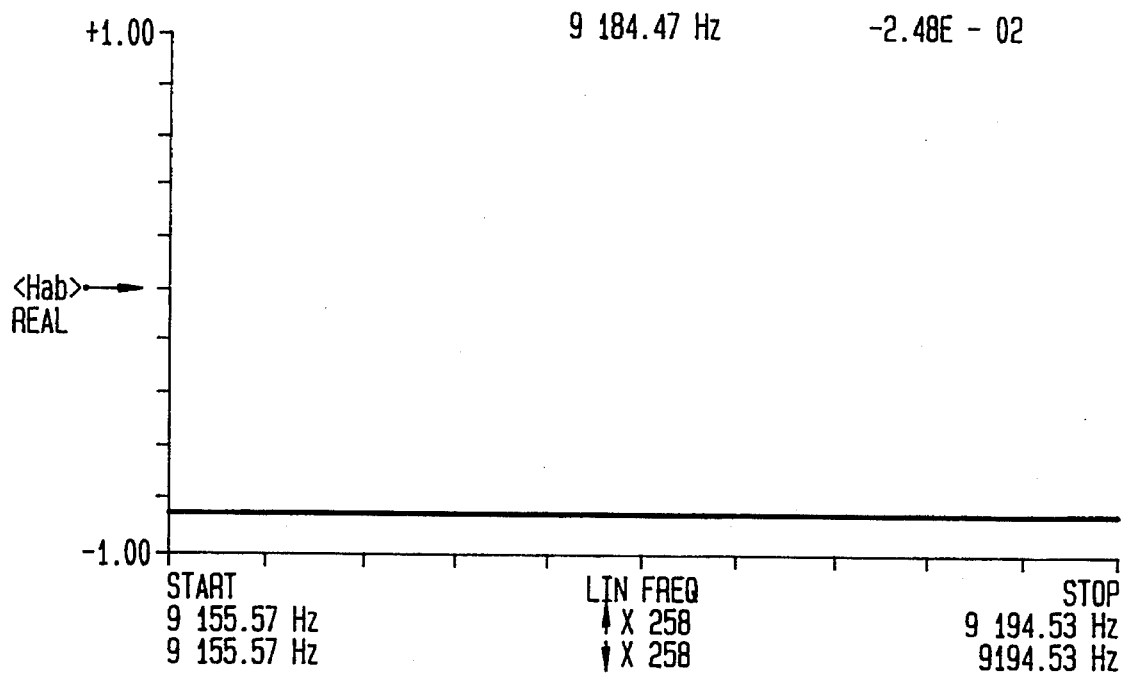
FIG. 36 illustrates measurements of the transfer characteristics of the imaginary component and the real number component of the output of one feedback amplifier in Example 17.
Figure 36B:
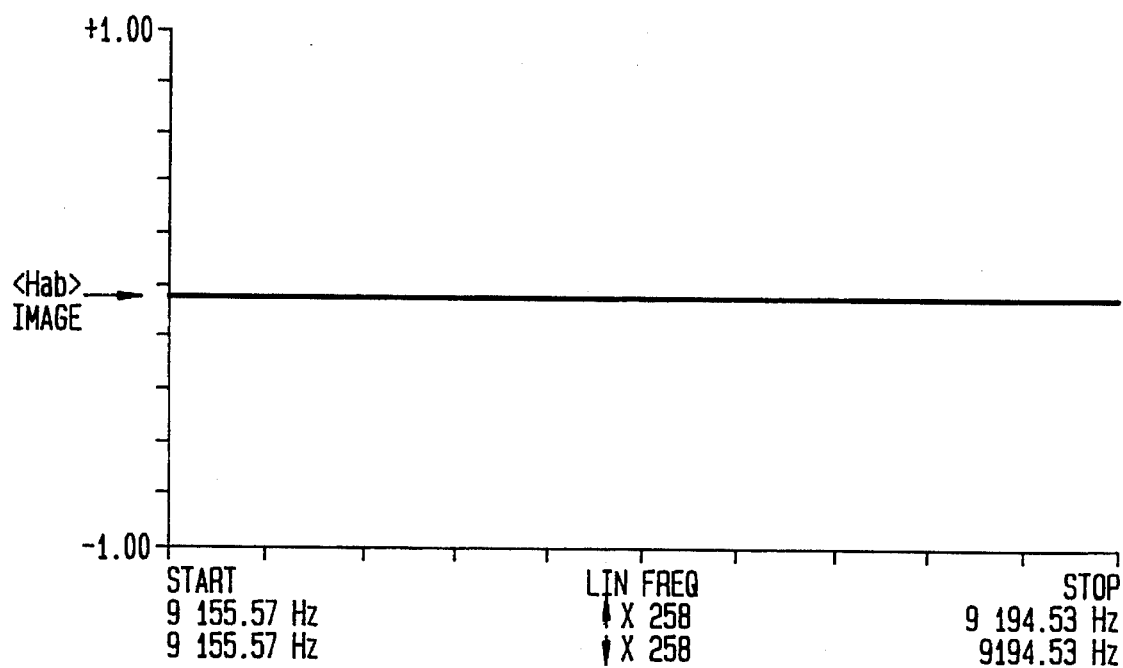

FIGS. 36A and B show the results of measuring the real part and the imaginary part of the output of one feedback amplifier 10L in FIG. 35 using the same vibrator 4 as used for the measurements in FIGS. 28 and FIG. 29.

In FIG. 35, the current flowing from integrating amplifier 21 into feedback input terminals 12L and 12R of feedback amplifiers 10L and 10R is varied according to the current flowing in piezo-electric elements 2 and 3 and according to the temperature dependence. Consequently, even under variations in ambient temperature, only a current corresponding to the Coriolis force, i.e., the imaginary part of the current and never the real part of the current, flows into feedback resistance $Rf_L$ and variable feedback resistance $Rf_R$ of feedback amplifiers 10L and 10R, as is apparent from FIGS. 6 A and B. Thus, it is possible to effectively decrease the formation of low voltage and its fluctuations, while also being able to more effectively amplify the phase component corresponding to the input angular velocity. Consequently, detection of the angular velocity at an even higher degree of accuracy than in FIG. 4 is possible.

Figure 37:
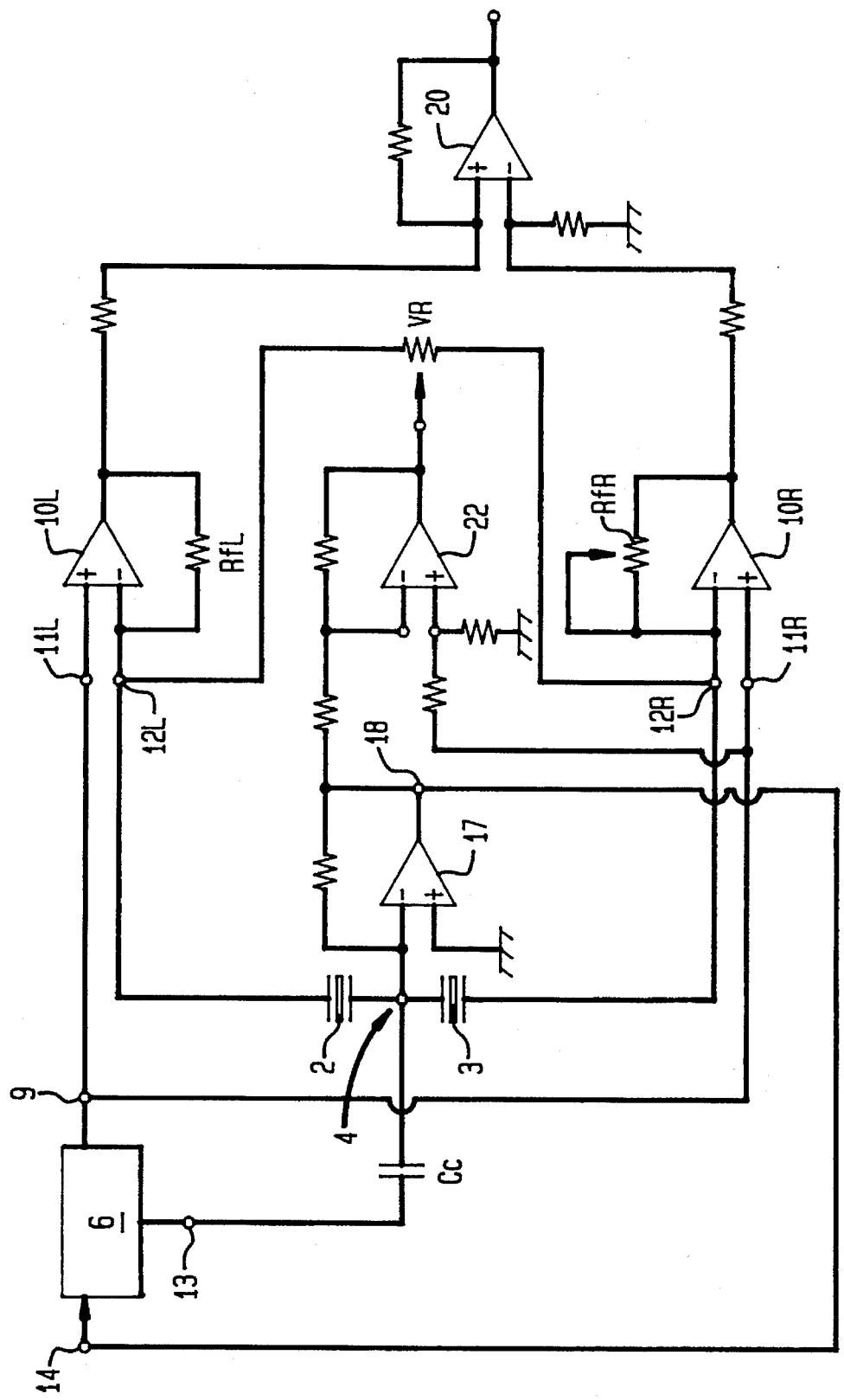
FIG. 37 illustrates Example 18 of the invention.

FIG. 37 illustrates Example 18 of the invention incorporating detection of angular velocity. Differential amplifier 22 is provided in place of the integrating amplifier 21 in Example 17, as illustrated in FIG. 35. The output of integrating amplifier 17 and the drive signal from signal output terminal 9 of drive apparatus 6 are supplied to differential amplifier 22. As in FIG. 35, the differential output of the differential amplifier 22 is supplied via variable resistance VR to feedback input terminals 12L and 12R of feedback amplifiers 10L and 10R. The supplied current is varied according to the currents flowing in the equivalent resistances of piezo-electric elements 2 and 3 in feedback input terminals 12L and 12R and according to the temperature dependence. Consequently, it is possible to detect the angular velocity at a higher degree of accuracy.

Although operational amplifiers were used as the feedback amplifiers 10L and 10R in the examples described above, it is also possible to use other feedback amplifiers. Similarly, although differential amplifiers were used to obtain the differential force of feedback amplifiers 10L and 10R in FIG. 4, FIG. 6, FIG. 8 and FIG. 13, it is also possible to have a construction that detects the angular velocity acting on vibrator 4 as in FIG. 16 and FIG. 17. It is also possible in these cases to slightly suppress the formation of low voltage and fluctuations as in FIG. 16 and FIG. 17. Further, it is not always necessary to combine the outputs of feedback amplifiers 10L and 10R in FIG. 4 and FIG. 6. Variable resistance VR and variable feedback resistance $Vf_R$ in Examples 16 through 18 may also be fixed resistances. Furthermore, the invention is not restricted to vibration gyroscopes, and can be applied as a vibration control apparatus for various vibrators.

The present invention, as described above, imparts self-oscillating vibrations by stabilizing a vibrator at a frequency set at mechanical series resonance frequency $f_s$. In other words, the vibrator oscillates at or near its resonant frequency. When applied to a vibration gyroscope, it is also possible to effectively decrease formation of low voltage and fluctuations. In particular, the supply signals are in-phase with the drive signal based on a combined signal comprising a compensation signal and the signals on the respective other electrodes of a pair of piezo-electric elements. This in-phase signal is supplied to feedback input terminals of two feedback amplifiers. Therefore, it is possible to effectively amplify the phase component corresponding to the angular velocity and to detect the angular velocity with a high degree of accuracy.

In the first embodiment, the feedback voltage gain of the feedback amplifier maximizes at a frequency in near agreement with the mechanical series resonance frequency $f_s$ of the vibrator, thereby making it possible to set the frequency of self-excitation vibration of the vibrator at a frequency in near agreement with the mechanical series resonance frequency $f_s$.

In the second and third embodiments, a certain amount of slippage from the mechanical series resonance frequency $f_s$ caused by the damping capacity of the vibrator is compensated for, thereby making it possible to set the frequency of self-excitation vibration of the vibrator at a frequency in accurate agreement with the mechanical series resonance frequency $f_s$.

The fourth embodiment allows the setting of the frequency of self-oscillating vibration of the vibrator to a frequency in near agreement with the mechanical series resonance frequency $f_s$, while at the same time making it possible to stabilize the respective outputs of the feedback amplifiers corresponding to each piezo-electric element. Consequently, the formation of low voltage and fluctuations is effectively decreased.

The fifth and sixth embodiments allow setting the frequency of self-oscillating vibration of the vibrator to a frequency in accurate agreement with the mechanical series resonance frequency $f_s$, while at the same time making it possible to effectively decrease the formation of low voltage and fluctuations.

In the other embodiments which detect angular velocity, the signal output terminal of the drive apparatus is connected to the signal input terminals of two feedback amplifiers. One electrode each of a pair of piezo-electric elements is connected to the feedback input terminals of the two feedback amplifiers. The other two electrodes are connected to the compensation output terminal of the drive apparatus. A combined signal of the compensation signal and the signals of the other electrode sides is fed back to the drive apparatus. The combined signal maximizes at a frequency in accurate agreement with the mechanical series resonance frequency of the vibrator. Consequently, it is possible to have the self-oscillation vibration of the vibrator stabilized at the mechanical series resonance frequency $f_s$, while also being possible to slightly suppress formation of low voltage and fluctuations.

Because a signal that is in-phase with the drive signal based on the combined signal is supplied to the feedback input terminals of the two feedback amplifiers, it is possible to effectively decrease the difference in outputs from the two feedback amplifiers, i.e., the formation of low voltage. Consequently, it is possible to detect the angular velocity at high accuracy when applied to vibration gyroscopes because the formation of low voltage and fluctuations are effectively decreased and the phase component corresponding to the input angular velocity can be effectively amplified.

Finally, the above-described embodiments of the present invention are intended to be illustrative only. Numerous alternatives may be devised by those skilled in the art without departing from the spirit and scope of the following claims.

I claim:

1. Vibration control apparatus comprising,
   (a) a vibrator having a vibrator member having at least one side surface with a resonance point,
   (b) a single piezo-electric element on said side surface, said piezo-electric element having at least first-and second electrodes,
   (c) a drive apparatus having a signal output terminal that outputs a drive signal of the vibrator, a compensating signal output terminal that outputs a compensating signal for the damping capacity of said vibrator, and a signal input terminal, and
   (d) a feedback amplifier having a feedback input terminal, a signal input terminal and a signal output terminal; wherein the signal input terminal of the feedback amplifier is connected to the signal output terminal of said drive apparatus, the feedback input terminal is connected to said first electrode of said piezo-electric element, and said second electrode of said piezo-electric element is connected to the compensating signal output terminal of said drive apparatus.

2. The vibration control apparatus of claim 1, wherein said signal output terminal of said feedback amplifier is connected to said signal input terminal of said drive apparatus, so that an output signal of said feedback amplifier is fed back to said drive apparatus.

3. A vibration control apparatus of claim 1, wherein said drive apparatus is constructed so that amplitude and phase of the compensating signal change in correspondence with a damping capacity value of said vibrator.

4. The vibration control apparatus of claim 3, wherein said drive apparatus further comprises a capacitor having a temperature dependence corresponding to the damping capacity temperature dependence of said vibrator and wherein the amplitude and phase of the compensation signal output from said compensation signal output terminal change in correspondence with the damping capacity temperature dependence of said vibrator by said capacitor.

5. The vibration control apparatus of claim 4, wherein said capacitor has an identical composition as said piezo-electric elements.

6. The vibration control apparatus of claim 1, wherein said drive apparatus further comprises a capacitor having a temperature dependence corresponding to the damping capacity temperature dependence of said vibrator and wherein amplitude and phase of the compensation signal output from said compensation signal output terminal change in correspondence with the damping capacity temperature dependence of said vibrator by said capacitor.

7. The vibration control apparatus of claim 6, wherein said capacitor has an identical composition as said piezo-electric elements.

8. Vibration control apparatus comprising,
   (a) a vibrator having a vibrator member having at least one side surface with a resonance point,
   (b) a single piezo-electric element on said side surface, said piezo-electric element having at least first and second electrodes,
   (c) a drive apparatus having a signal output terminal that outputs a drive signal of the vibrator, a compensating signal output terminal that outputs a compensating signal for the damping capacity of said vibrator, and a signal input terminal, and
   (d) a feedback amplifier having a signal output terminal, a feedback input terminal and a signal input terminal; wherein the signal input terminal of the feedback amplifier is connected to said drive apparatus, the feedback input terminal is connected to said first electrode of said piezo-electric element, said second electrode of said piezo-electric element is connected to ground, and the compensating signal output terminal of said drive apparatus is connected to the input terminal of said feedback amplifier.

9. The vibration control apparatus as in claim 8, wherein said output terminal of said feedback amplifier is connected to said signal input terminal of said drive apparatus, so that the compensating signal and an output signal of said feedback amplifier are combined and fed back to said drive apparatus.

10. A vibration control apparatus of claim 9, wherein said drive apparatus is constructed so that amplitude and phase of the compensating signal outputted change in correspondence with a damping capacity value of said vibrator.

11. The vibration control apparatus of claim 10, wherein said drive apparatus further comprises a capacitor having a temperature dependence corresponding to the damping capacity temperature dependence of said vibrator and wherein the amplitude and phase of the compensation signal output from said compensation signal output terminal change in correspondence with the damping capacity temperature dependence of said vibrator by said capacitor.

12. The vibration control apparatus of claim 11, wherein said capacitor has an identical composition as said piezo-electric elements.

13. A vibration control apparatus of claim 8, wherein said drive apparatus is constructed so that amplitude and phase of the compensating signal change in correspondence with a damping capacity value of said vibrator.

14. The vibration control apparatus of claim 13, wherein said drive apparatus further comprises a capacitor having a temperature dependence corresponding to the damping capacity temperature dependence of said vibrator and wherein the amplitude and phase of the compensation signal output from said compensation signal output terminal change in correspondence with the damping capacity temperature dependence of said vibrator by said capacitor.

15. The vibration control apparatus of claim 14, wherein said capacitor has an identical composition as said piezo-electric elements.

16. The vibration control apparatus of claim 8, wherein said drive apparatus further comprises a capacitor having a temperature dependence corresponding to the damping capacity temperature dependence of said vibrator and wherein the amplitude and phase of the compensation signal output from said compensation signal output terminal change in correspondence with the damping capacity temperature dependence of said vibrator by said capacitor.

17. The vibration control apparatus of claim 16, wherein said capacitor has an identical composition as said piezo-electric elements.

18. Vibration control apparatus comprising, (a) a vibrator having a vibrator member having at least one side surface with a resonance point, (b) first and second piezo-electric elements on said at least one side surface, each piezo-electric element having at least first and second electrodes, (c) a drive apparatus having a signal output terminal that outputs a drive signal of the vibrator and a signal input terminal, and (d) first and second feedback amplifiers, each having a feedback input terminal, a signal input terminal and a signal output terminal;

wherein the respective signal input terminals of said first and second feedback amplifiers are connected to the signal output terminal of said drive apparatus, the feedback input terminal of said first feedback amplifier is connected to said first electrode of said first piezo-electric element, the feedback input terminal of said second feedback amplifier is connected to said first electrode of said second piezo-electric element, and said second electrodes of said first and second piezo-electric elements are connected to ground, wherein said output terminals of said first and second feedback amplifiers are connected to said input terminal of said drive apparatus, so that respective output signals of said two feedback amplifiers are combined and fed back to said drive apparatus, and wherein said drive apparatus further comprises a capacitor having a temperature dependence corresponding to the damping capacity temperature dependence of said vibrator and wherein the amplitude and phase of the compensation signal output from said compensation signal output terminal change in correspondence with the damping capacity temperature dependence of said vibrator by said capacitor.

19. The vibration control apparatus of claim 18, wherein said capacitor has an identical composition as said piezo-electric elements.

20. Vibration control apparatus comprising, (a) a vibrator having a vibrator member having at least one side with a resonance point, (b) first and second piezo-electric elements on said at least one side surface, each piezo-electric element having at least first and second electrodes, (c) a drive apparatus having a signal output terminal that outputs a drive signal of the vibrator, a compensating signal output terminal that outputs a compensating signal for damping capacity of said vibrator, and a signal input terminal, and (d) first ann second feedback amplifiers, each having a feedback input terminal, a signal input terminal and a signal output terminal;

wherein the respective signal input terminals of said first and second feedback amplifiers are connected to the signal output terminal of said drive apparatus, the feedback input terminal of said first feedback amplifier is connected to said first electrode of said first piezo-electric element, the feedback input terminal of said second feedback amplifier is connected to said first electrode of said second piezo-electric element, and said second electrodes of said first and second piezo-electric elements are connected to the compensating signal output terminal of said drive apparatus.

21. Vibration control apparatus comprising, (a) a vibrator having a vibrator member having at least one side surface with a resonance point, (b) first and second piezo-electric elements on said at least one side surface, each piezo-electric element having at least first and second electrodes, (c) a drive apparatus having a signal output terminal that outputs a drive signal of the vibrator and a signal input terminal, and (d) first and second feedback amplifiers, each having a feedback input terminal, a signal input terminal and a signal output terminal;

wherein the respective signal input terminals of said first and second feedback amplifiers are connected to the signal output terminal of said drive apparatus, the feedback input terminal of said first feedback amplifier is connected to said first electrode of said first piezo-electric element, the feedback input terminal of said second feedback amplifier is connected to said first electrode of said second piezo-electric element, and said second electrodes of said first and second piezo-electric elements are connected to ground, wherein said signal output terminals of said first and second feedback amplifiers are connected to said signal input terminal of said drive apparatus, so that respective output signals of said two feedback amplifiers are combined and fed back to said drive apparatus, and wherein said drive apparatus further comprises a capacitor having a temperature dependence corresponding to the damping capacity temperature dependence of said vibrator and wherein the amplitude and phase of the compensation signal output from said compensation signal output terminal change in correspondence with the damping capacity temperature dependence of said vibrator by said capacitor.

22. The vibration control apparatus of claim 21, wherein said capacitor has an identical composition as said piezo-electric elements.

23. A vibration control apparatus of claim 20, wherein said drive apparatus is constructed so that amplitude and phase of the compensating signal change in correspondence with a damping capacity value of said vibrator.

24. The vibration control apparatus of claim 23, wherein said drive apparatus further comprises a capacitor having a temperature dependence corresponding to the damping capacity temperature dependence of said vibrator and wherein the amplitude and phase of the compensation signal output from said compensation signal output terminal change in correspondence with the damping capacity temperature dependence of said vibrator by said capacitor.

25. The vibration control apparatus of claim 24, wherein said capacitor has an identical composition as said piezo-electric elements.

26. A vibration control apparatus of claim 20, further comprising a differential amplifier having input terminals connected to said output terminals of said first and second feedback amplifiers to detect a difference in output signals of said two feedback amplifiers.

27. The vibration control apparatus of claim 20, wherein said drive apparatus further comprises a capacitor having a temperature dependence corresponding to the damping capacity temperature dependence of said vibrator and wherein amplitude and phase of the compensation signal output from said compensation signal output terminal change in correspondence with the damping capacity temperature dependence of said vibrator by said capacitor.

28. The vibration control apparatus of claim 27, wherein said capacitor has an identical composition as said piezo-electric elements.

29. Vibration control apparatus comprising,
    (a) a vibrator having a vibrator member having a side surface with a resonance point,
    (b) first and second piezo-electric elements on a said side surface, each piezo-electric element having at least first and second electrodes,
    (c) a drive apparatus having a signal output terminal that outputs a drive signal of the vibrator, a compensating signal output terminal that outputs a compensating signal for damping capacity of said vibrator, and a signal input terminal, and
    (d) first and second feedback amplifiers, each having a feedback input terminal, a signal input terminal, and a signal output terminal;
wherein the respective signal input terminals of said first and second feedback amplifiers are connected to the signal output terminal of said drive apparatus, the feedback input terminal of said first feedback amplifier is connected to said first electrode of said first piezo-electric element, the feedback input terminal of said second feedback amplifier is connected to said first electrode of said second piezo-electric element, said second electrodes of said first and second piezo-electric elements are connected to ground, and the compensating signal output terminal of said drive apparatus is connected to said two feedback amplifiers.

30. A vibration control apparatus as in claim 29, wherein said output terminals of said first and second feedback amplifiers are connected to said input terminal of said drive apparatus, so that the compensating signal and respective output signals of said two feedback amplifiers are combined and fed back to said drive apparatus.

31. A vibration control apparatus of claim 30, wherein said drive apparatus is constructed so that amplitude and phase of the compensating signal change in correspondence with a damping capacity value of said vibrator.

32. A vibration control apparatus of claim 31, further comprising a differential amplifier having input terminals connected to said output terminals of said first and second feedback amplifiers to detect a difference in output signals of said two feedback amplifiers.

33. A vibration control apparatus of claim 36, further comprising a differential amplifier having input terminals connected to said output terminals of said first and second feedback amplifiers to detect a difference in output signals of said two feedback amplifiers.

34. A vibration control apparatus of claim 29, further comprising a differential amplifier having input terminals connected to said output terminals of said first and second feedback amplifiers to detect a difference in output signals of said two feedback amplifiers.

35. The vibration control apparatus of claim 29, wherein said drive apparatus further comprises a capacitor having a temperature dependence corresponding to the damping capacity temperature dependence of said vibrator and wherein the amplitude and phase of the compensation signal output from said compensation signal output terminal change in correspondence with the damping capacity temperature dependence of said vibrator by said capacitor.

36. The vibration control apparatus of claim 35 wherein said capacitor has an identical composition as said piezo-electric elements.

37. A vibration control apparatus of claim 23, further comprising a differential amplifier having input terminals connected to said output terminals of said first and second feedback amplifiers to detect a difference in output signals of said two feedback amplifiers.

38. Vibration control apparatus comprising,
    (a) a vibrator having a vibrator member having at least one side surface with a resonance point,
    (b) first and second piezo-electric elements on said at least one side surface, each piezo-electric element having at least first and second electrodes,
    (c) a drive apparatus having a signal output terminal that outputs a drive signal of the vibrator, a compensation signal output terminal that outputs a compensation signal of damping capacity of said vibrator, and a signal input terminal, and
    (d) first and second feedback amplifiers, each having a feedback input terminal, a signal input terminal, and a signal output terminal;
wherein the respective signal input terminals of said first and second feedback amplifiers are connected to said signal output terminal of said drive apparatus, the feedback input terminal of said first feedback amplifier is connected to said first electrode of said first piezo-electric element, the feedback input terminal of said second feedback amplifier is connected to said first electrode of said second piezo-electric element, and the output terminals of said first and second feedback amplifiers are connected to said signal input terminal of said drive apparatus so that a combined signal comprising said compensation signal and signals from the second electrodes is fed back to said feedback apparatus.

39. The vibration control apparatus of claim 38, wherein amplitude and phase of said compensation signal is varied in correspondence with a damping capacity value of said vibrator.

40. The vibration control apparatus of claim 38, further comprising a differential amplifier having input terminals connected to said output terminals of said first and second feedback amplifiers to detect difference in outputs of said two feedback amplifiers.

41. The vibration control apparatus of claim 38, comprising a capacitor having a temperature dependence corresponding to the damping capacity of said vibrator and connected to said compensation signal output terminal of said drive apparatus.

42. The vibration control apparatus of claim 41, wherein said capacitor has an identical composition to said piezo-electric elements.

43. Vibration control apparatus comprising,
   (a) a vibrator having a vibrator member having at least one side surface with,
   (b) at least first and second piezo-electric elements on said at least one side surface, each piezo-electric having at least first and second electrodes,
   (c) a drive apparatus having a signal output terminal that outputs a drive signal of the vibrator, a compensation signal output terminal that outputs a compensation signal of the damping capacity of said vibrator, and a signal input terminal, and
   (d) first and second feedback amplifiers each having a feedback input terminal, a signal input terminal, and a signal output terminal;
   wherein the respective signal input terminals of said first and second feedback amplifiers are connected to said signal output terminal of said drive apparatus, the feedback input terminal of said first feedback amplifier is connected to said first electrode of said first piezo-electric element, the feedback input terminal of said second feedback amplifier is connected to said first electrode of said second piezo-electric element, and said output terminals of said first and second feedback amplifiers are connected to the signal input terminal of said drive apparatus, so that a combined signal comprising the compensation signal and signals from said second electrodes is fed back to said feedback apparatus and a signal that is in-phase with said drive signal based on said combined signal is supplied to the respective input terminals of said two feedback amplifiers.

44. The vibration control apparatus of claim 43, wherein said in-phase signal is formed by combining said combined signal and said compensation signal.

45. The vibration control apparatus of claim 43, wherein said in-phase signal is formed by combining said combined signal and said drive signal.

46. The vibration control apparatus of claim 43, wherein amplitude and phase of said compensation signal are varied in correspondence with a damping capacity value of said vibrator.

47. The vibration control apparatus of claim 43, further comprising a differential amplifier having input terminals connected to said output terminals of said first and second feedback amplifiers to detect difference in outputs of said two feedback amplifiers.

48. The vibration control apparatus of claim 43, further comprising a capacitor having a temperature dependence corresponding to the damping capacity of said vibrator and connected to said compensation signal output terminal of said drive apparatus.

49. The vibration control apparatus of claim 42, wherein said capacitor has an identical composition to said piezo-electric elements.

50. Vibration control apparatus comprising,
   (a) a vibrator having a vibrator member having at least one side surface with a resonance point,
   (b) at least first and second piezo-electric elements on said at least one side surface, each piezo-electric element having at least first and second electrodes,
   (c) a drive apparatus having a signal output terminal that outputs a drive signal of the vibrator, a compensation signal output terminal that outputs a compensation signal of damping capacity of said vibrator, and a signal input terminal, and
   (d) first and second feedback amplifiers having respective feedback input terminals, signal input terminals, and signal output terminals, at least one of said first and second feedback amplifiers having a feedback resistance that is a variable resistance;
   wherein the signal input terminals of said first and second feedback amplifiers are connected to said signal output terminal of said drive apparatus, the feedback input terminal of said first feedback amplifier is connected to said first electrode of said first piezo-electric element, the feedback input terminal of said second feedback amplifier is connected to said first electrode of said second piezo-electric elements, said second electrodes of said first and second piezo-electric elements are connected to said compensation signal output terminal and said output terminals of said first and second feedback amplifiers are connected to the signal input terminal of said drive apparatus, so that a combined signal comprising said compensation signal and signals from said second electrodes of said first and second piezo-electric elements is fed back to said drive apparatus and a signal in-phase with said drive signal based on the combined signal is supplied via said variable resistance to the feedback input terminals of said two feedback amplifiers.

51. The vibration control apparatus of claim 50, wherein said in-phase signal is formed by combining said combined signal and said compensation signal.

52. The vibration control apparatus of claims 50, wherein said in-phase signal is formed by combining said combined signal and said drive signal.

53. The vibration control apparatus of claim 50, wherein amplitude and phase of said compensation signal is varied in correspondence with a damping capacity value of said vibrator.

54. The vibration control apparatus of claim 50, further comprising a differential amplifier having input terminals connected to said output terminals of said first and second feedback amplifiers to detect difference in outputs of said two feedback amplifiers.

55. The vibration control apparatus of claim 50, comprising a capacitor having a temperature dependence corresponding to the damping capacity of said vibrator and connected to said compensation signal output terminal of said drive apparatus.

56. The vibration control apparatus of claim 55, wherein said capacitor has an identical composition to said piezo-electric elements.

* * * * *